United States Patent
Sawai et al.

(10) Patent No.: US 7,698,475 B2
(45) Date of Patent: Apr. 13, 2010

(54) DMA TRANSFER CONTROL APPARATUS FOR PERFORMING DIRECT MEMORY ACCESS TRANSFER FROM A TRANSFER SOURCE TO A TRANSFER DESTINATION

(75) Inventors: Takatsugu Sawai, Osaka (JP); Koji Karatani, Osaka (JP)

(73) Assignee: Panasonic Corporation, Osaka (JP)

( * ) Notice: Subject to any disclaimer, the term of this patent is extended or adjusted under 35 U.S.C. 154(b) by 41 days.

(21) Appl. No.: 11/783,798

(22) Filed: Apr. 12, 2007

(65) Prior Publication Data

US 2008/0028108 A1 Jan. 31, 2008

(30) Foreign Application Priority Data

Jul. 31, 2006 (JP) ............... 2006-207744

(51) Int. Cl.
*G06F 13/28* (2006.01)
*G06F 15/167* (2006.01)
*G06F 12/00* (2006.01)

(52) U.S. Cl. .................. 710/22; 709/212; 710/23; 710/24; 711/1; 711/112

(58) Field of Classification Search ............. 710/22–24; 709/212; 711/1, 112
See application file for complete search history.

(56) References Cited

U.S. PATENT DOCUMENTS 6,330,631 B1    12/2001  Crosland
6,363,438 B1 *   3/2002  Williams et al. .............. 710/22
2003/0046458 A1  3/2003  Morishima

* cited by examiner

*Primary Examiner*—Niketa I Patel
(74) *Attorney, Agent, or Firm*—McDermott Will & Emery LLP

(57) ABSTRACT

A DMA transfer control apparatus comprises an internal memory for temporarily storing data, a buffer for temporarily storing data, a selector for selecting one of input data to the buffer and output data from the buffer per byte, and a rotator for rotating data. The internal memory receives read data from a transfer source, the buffer receives data from the internal memory, the selector receives data from the internal memory and data from the buffer, and the rotator receives data selected by the selector. An output of the rotator is used as write data. Thereby, high-speed DMA transfer is performed even when data transfer source addresses and data transfer destination addresses have different byte alignments where the addresses are located.

7 Claims, 22 Drawing Sheets

DMA TRANSFER CONTROL APPARATUS FOR PERFORMING DIRECT MEMORY ACCESS TRANSFER FROM A TRANSFER SOURCE TO A TRANSFER DESTINATION

BACKGROUND OF THE INVENTION

1. Field of the Invention

The present invention relates to data transfer between buses of a computer system. More particularly, the present invention relates to a direct memory access (DMA) transfer control apparatus for transferring data between devices, a bus adaptor for transferring data between buses, a computer system incorporating either or both of the bus adaptor and the DMA transfer control apparatus, and a method for transferring data between buses.

2. Description of the Related Art

Conventionally, a DMA transfer method for directly transferring data between transfer devices without a CPU is widely known and, for example, is used to perform direct data transfer between memories.

In DMA transfer, information required for transfer, such as a data transfer source address, a data transfer destination address, a data transfer size or the like, is set in registers or the like of a DMA transfer control apparatus, and thereafter, a transfer operation is executed by a CPU or the like controlling the start of transfer. Since the CPU is not required to perform a transfer control during transfer, data transfer can be performed at a higher rate than when data is transferred via the CPU, and in addition, the load on the CPU can be reduced. After data has been transferred in an amount corresponding to the transfer size set in the registers or the like, a DMA transfer end interrupt is asserted, depending on a setting of the DMA transfer control apparatus. The CPU, when detecting the DMA transfer end interrupt, reads the registers or the like of the DMA transfer control apparatus to monitor a result or a status of DMA transfer.

Also, in DMA transfer, burst transfer is often utilized in which, after only one address is designated, a plurality of pieces of byte data can be successively transferred.

In DMA transfer, when data transfer source address and data transfer destination address are set to have different byte alignments where the addresses are located, read data cannot be directly used as write data. Therefore, for example, a process of regenerating write data from two cycles of read data is required, depending on the addresses.

To solve such a problem, a conventional transfer control apparatus comprises a shifter for shifting read data and an accumulator for selectively accumulating shifted bytes and supplying output bytes (see U.S. Pat. No. 6,330,631).

A burst transfer operation in this conventional technique when transfer source addresses and transfer destination addresses have different byte alignments will be described with reference to FIG. 22. One piece of read data is subjected to a two-phase transfer process. In the first phase, read data is shifted, depending on a set address, and for a byte which can be immediately output as write data, a byte enable signal to be supplied to the accumulator is activated and the byte is written into the accumulator, and at the same time, the accumulator outputs write data. In the second phase, for a byte which was not output as write data in the first phase, a byte enable signal to be supplied to the accumulator is activated and the byte is written into the accumulator, and resultant data is accumulated. These bytes are output as write data together with a portion of the next read data in the next first phase.

However, in the conventional transfer control apparatus, when transfer source addresses and transfer destination addresses have different byte alignments, a two-phase process is required for one piece of read data, resulting in a decrease in data transfer rate.

SUMMARY OF THE INVENTION

An object of the present invention is to provide a DMA transfer control apparatus which can perform data transfer without a decrease in transfer rate even when transfer source addresses and transfer destination addresses have different byte alignments.

The DMA transfer control apparatus of the present invention comprises an internal memory for temporarily storing data, a buffer for temporarily storing data, a selector for selecting one of input data to the buffer and output data from the buffer per byte, and a rotator for rotating data. The internal memory, the selector having the buffer, and the rotator are connected in any order.

As a specific connection, the internal memory receives read data from a transfer source, the buffer receives data from the internal memory, the selector receives data from the internal memory and data from the buffer, and the rotator receives data selected by the selector.

Alternatively, the buffer receives read data from a transfer source, the selector receives read data from the transfer source and data from the buffer, the rotator receives data selected by the selector, and the internal memory receives data from the rotator.

Alternatively, the internal memory receives read data from a transfer source, the rotator receives data from the internal memory, the buffer receives data from the rotator, and the selector receives data from the rotator and data from the buffer.

Alternatively, the rotator receives read data a transfer source, the buffer receives data from the rotator, the selector receives data from the rotator and data from the buffer, and the internal memory receives data selected by the selector.

Alternatively, the rotator receives read data from a transfer source, the internal memory receives data from the rotator, the buffer receives data from the internal memory, and the selector receives data from the internal memory and data from the buffer.

Alternatively, the buffer receives read data from a transfer source, the selector receives read data from the transfer source and data from the buffer, the internal memory receives data selected by the selector, and the rotator receives data from the internal memory.

According to the DMA transfer control apparatus of the present invention, even when transfer source addresses and transfer destination addresses have different byte alignments, the timing of outputting a portion of read data as write data is the same as the timing of saving it for the next write data, whereby DMA transfer can be performed without a decrease in transfer rate.

Also, in the DMA transfer control apparatus of the present invention, the rotator determines the number of rotation stages, using a difference between a transfer source address and a transfer destination address.

According to the DMA transfer control apparatus of the present invention, data alignment adjustment from a transfer source address to a transfer destination address can be achieved by a single rotation operation.

Also, in the DMA transfer control apparatus of the present invention, the selector determines selection, using a difference between a transfer source address and a transfer destination address.

According to the DMA transfer control apparatus of the present invention, in the selector, input data to be used for generation of write data can be accurately selected per byte.

Also, the DMA transfer control apparatus of the present invention further comprises at least one of a read size determining circuit for determining a read transfer size for a transfer source and a write size determining circuit for determining a write transfer size for a transfer destination.

According to the DMA transfer control apparatus of the present invention, by taking into consideration not only a set transfer size but also another factor, a transfer size which can increase transfer efficiency can be determined.

Also, in the DMA transfer control apparatus of the present invention, the read size determining circuit and the write size determining circuit determine a read size or a write size using at least one of a transfer source address and a transfer destination address.

According to the DMA transfer control apparatus of the present invention, when transfer source addresses and transfer destination addresses have different alignments, transfer efficiency can be improved by adjusting a transfer size.

Also, in the DMA transfer control apparatus of the present invention, the read size determining circuit and the write size determining circuit determine a read size or a write size using a continuous area size from a read address of a transfer source and a continuous area size from a write address of a transfer destination.

According to the DMA transfer control apparatus of the present invention, by adjusting read transfer or write transfer so that a continuous area size is not exceeded, DMA transfer which supports either or both of read data and write data in a discontinuous area can be achieved without requirement of an additional circuit for handling transfer data in a discontinuous area.

Also, in the DMA transfer control apparatus of the present invention, the rotator determines the number of rotation stages using a continuous area size from a read address of a transfer source and a continuous area size from a write address of a transfer destination.

Also, in the DMA transfer control apparatus of the present invention, the selector determines selection using a continuous area size from a read address of a transfer source and a continuous area size from a write address of a transfer destination.

According to the DMA transfer control apparatus of the present invention, write data in a continuous area is generated from read data having a discontinuous area size, or write data in a discontinuous area is generated from read data having a continuous area size, or write data in different discontinuous areas is generated from read data having a discontinuous area size, thereby making it possible to achieve high-speed DMA transfer which supports read data or write data in a discontinuous area.

Also, in some aspects of the DMA transfer control apparatus of the present invention, the apparatus further comprises a second buffer for temporarily storing data, and a second selector for selecting one of input data to the second buffer and output data from the second buffer per byte. Output data from the second selector is input to the internal memory or the rotator.

According to the DMA transfer control apparatus of the present invention, when read data has a data width smaller than a transfer bus width, read data is accumulated in the second buffer before being stored into the internal memory, thereby making it possible to efficiently use the internal memory.

Also, in some aspects of the DMA transfer control apparatus of the present invention, a selection function of the selector and a rotation function of the rotator are achieved by a selector/rotator circuit for selecting and outputting one of data generated by combining two pieces of input data per byte in any manner.

According to the DMA transfer control apparatus of the present invention, the selection function and the rotation function can be achieved using a small-scale circuit, resulting in a decrease in circuit scale.

Also, in the DMA transfer control apparatus of the present invention, when transfer source addresses and transfer destination addresses have the same alignment, the buffer is not used.

According to the DMA transfer control apparatus of the present invention, the buffer is controlled not to be used when alignment adjustment is not required, thereby making it possible to suppress power consumption.

Although the present invention is described in detail in the independent and dependent claims, a combination of the dependent claims can be appropriately combined with the feature of the independent claim. Thus, the present invention is not limited by the explicit description of the claims.

As described above, according to the DMA transfer control apparatus of the present invention, even when transfer source addresses and transfer destination addresses have different byte alignments, write data can be generated with higher speed than in the conventional art, thereby making it possible to perform DMA transfer without a decrease in transfer rate.

Also, according to the DMA transfer control apparatus of the present invention, even when data including a discontinuous area, such as a rectangular area, is transferred, DMA transfer which can support transfer data in a discontinuous area can be achieved without requirement of a special circuit. In addition, data including a discontinuous area can be converted into data in a continuous area or data including different discontinuous areas, resulting in high-speed DMA transfer.

DETAILED DESCRIPTION OF THE PREFERRED EMBODIMENTS

Hereinafter, embodiments of a DMA transfer control apparatus according to the present invention will be described with reference to the accompanying drawings. Note that techniques and configurations used in the embodiments of the present invention are only for illustrative purposes and are not restrictive.

Embodiment 1

Figure 1:
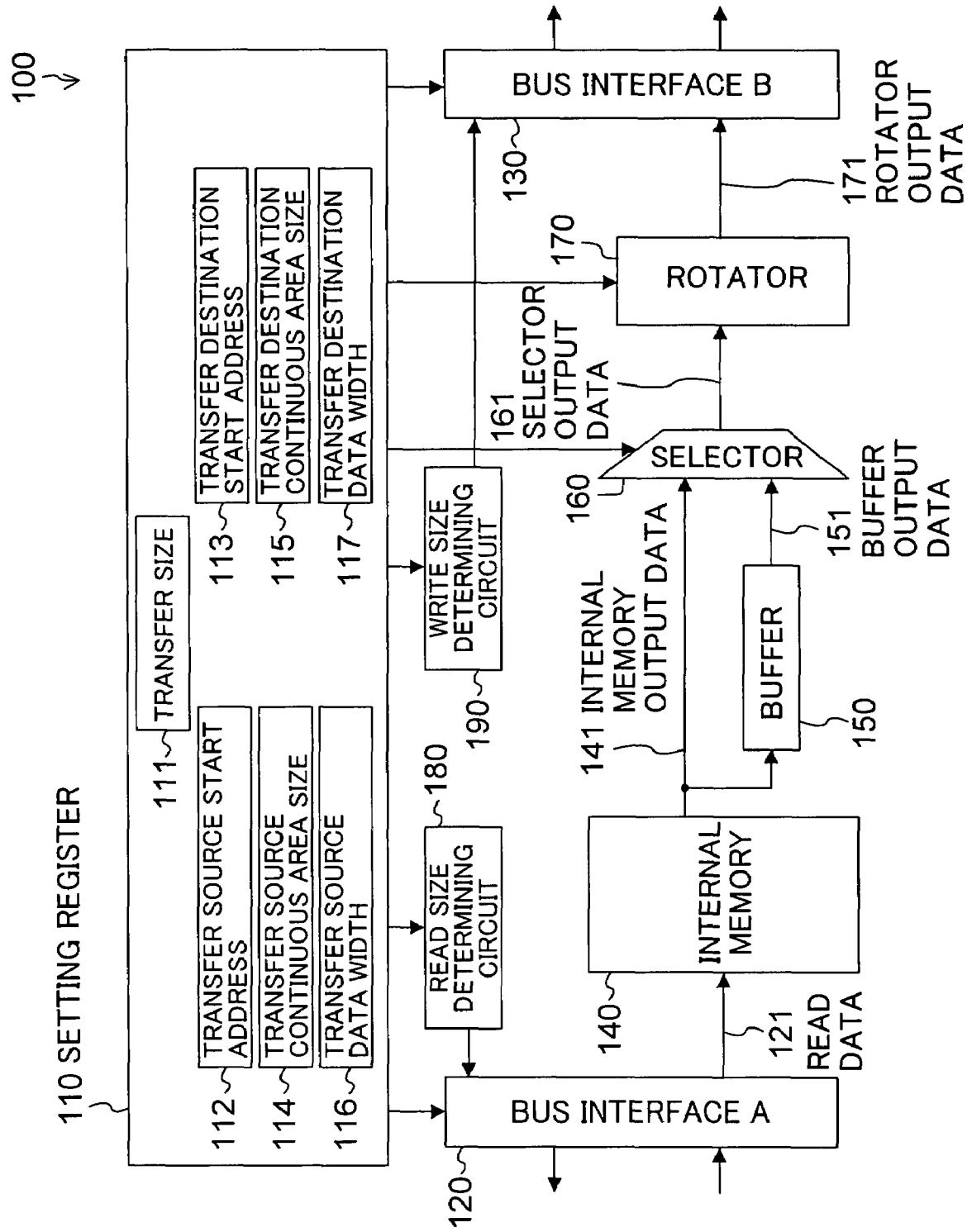
FIG. 1 is a block diagram schematically showing a DMA transfer control apparatus according to Embodiment 1 of the present invention.

FIG. 1 is a block diagram schematically showing a DMA transfer control apparatus 100 according to Embodiment 1 of the present invention. In the DMA transfer control apparatus 100 of this embodiment, a transfer source device or a bus to which the transfer source device is connected is connected to a bus interface A 120, and a transfer destination device or a bus to which the transfer destination device is connected is connected to a bus interface B 130.

The DMA transfer control apparatus 100 has the bus interface A 120, an internal memory 140 which receives read data 121 output from the bus interface A 120, a buffer 150 which receives internal memory output data 141 output from the internal memory 140, a selector 160 which receives the internal memory output data 141 and buffer output data 151 output from the buffer 150, a rotator 170 which receives selector output data 161 output from the selector 160, and the bus interface B 130 which receives rotator output data 171 output from the rotator 170.

The DMA transfer control apparatus 100 also has a setting register 110 in which a transfer size 111, a transfer source start address 112, a transfer destination start address 113, a transfer source continuous area size 114, a transfer destination continuous area size 115, a transfer source data width 116, and a transfer destination data width 117 are set.

The DMA transfer control apparatus 100 also has a read size determining circuit 180 and a write size determining circuit 190.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 100 of this embodiment will be described. The read data 121 which is read from the transfer source device via the bus interface A 120 is temporarily stored in the internal memory 140 so as to execute burst transfer. After an appropriate size of data is accumulated in the internal memory 140, the data is read from the internal memory 140. The data output from the internal memory 140 is input to the selector 160 and the buffer 150 simultaneously. The buffer 150 temporarily stores the data before outputting the data to the selector 160. The selector 160 selects one of the two pieces of input data per byte, depending on a difference obtained by subtracting a set value of the transfer source start address 112 from a set value of the transfer destination start address 113. Data output from the selector 160 is input to the rotator 170. The rotator 170 determines the number of rotation stages, depending on the address difference, and rotates the input data, depending on the determined number of rotation stages. Data output from the rotator 170 is transferred via the bus interface B 130 to the transfer destination device.

Figure 2:
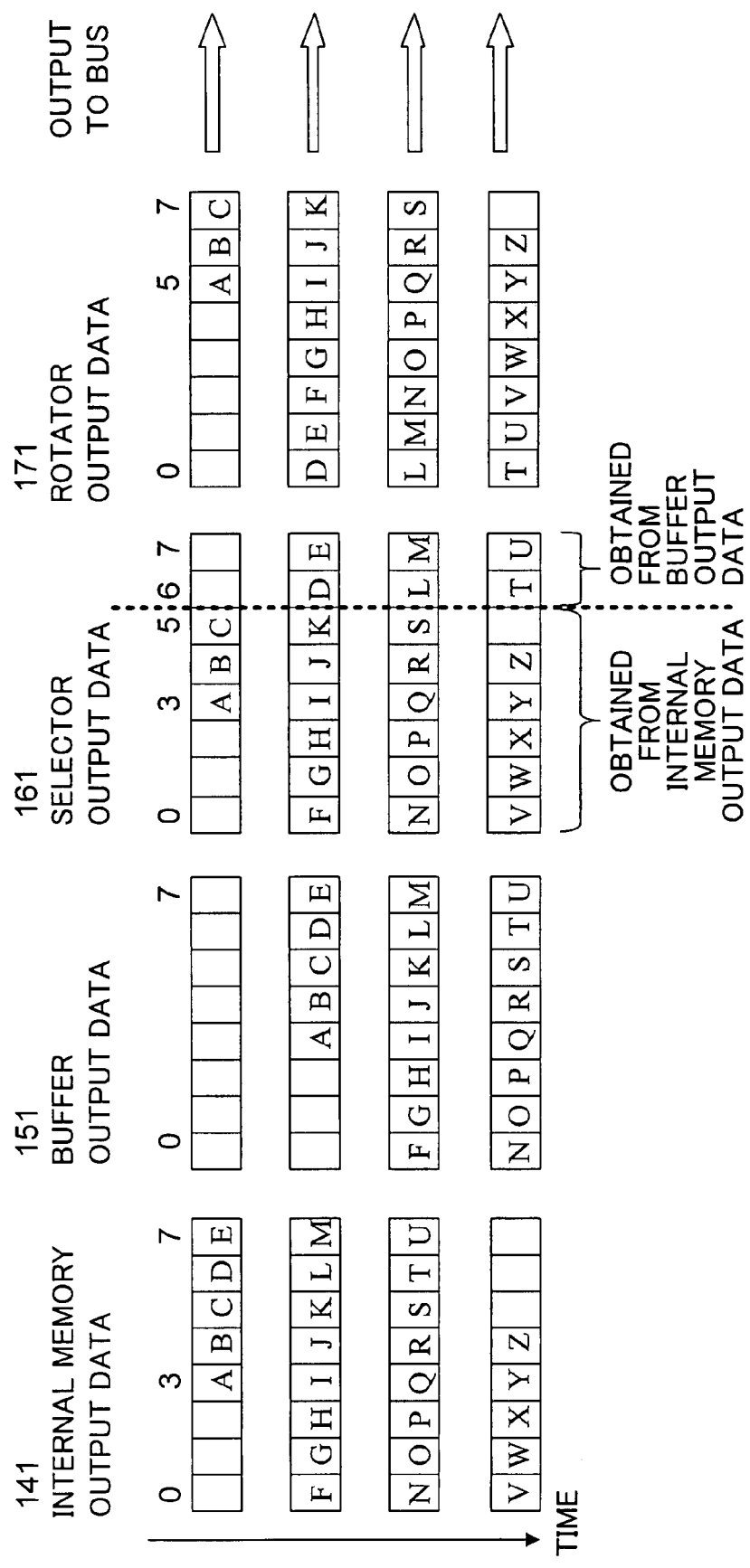
FIG. 2 is a timing flow diagram for describing an exemplary transfer operation when transfer source addresses and transfer destination addresses have different byte alignments, in Embodiment 1 of the present invention.

An exemplary transfer operation when transfer source addresses and transfer destination addresses have different byte alignments (unalignment transfer) will be described with reference to FIG. 2. A transfer bus width is 8 bytes. The three lowest bits of a transfer source start address have a value of 3, and the three lowest bits of a transfer destination start address have a value of 5. Thus, in the transfer source and the transfer destination, the addresses are not aligned with the transfer bus width, and valid data starts from a halfway byte in leading data.

Initially, leading read data "xxxABCDE" is output from the internal memory 140 to the buffer 150 and the selector 160. In the selector 160, selection is performed per byte, depending on a difference obtained by subtracting the three lowest bits of the set value of the transfer source start address 112 from the three lowest bits of the set value of the transfer destination start address 113. In this example, since the difference is 2, the last two bytes of the eight bytes are selected from the buffer output data 151, and the remaining bytes are selected from the internal memory output data 141. Specifically, the zeroth to fifth bytes are selected from the internal memory output data 141, while the sixth and seventh bytes are selected from the buffer output data 151. Therefore, from the leading read data, only "xxxABC" required for generation of leading write data is selected, and "DE" is not selected. Selector output data 161 is input to the rotator 170, in which the selector output data 161 is rotated in the right direction by the address difference. Specifically, the input "xxxABCxx" is rotated in the right direction, and the resultant "xxxxxABC" is output and transferred via the bus interface B 130 to the transfer destination device. The internal memory output data 141 which is input to the buffer 150 is temporarily stored.

In the next cycle, the next read data "FGHIJKLM" is output from the internal memory 140 to the buffer 150 and the selector 160 as in the previous cycle. In the selector 160, since the bytes are split between the fifth byte and the sixth byte as in the previous cycle, "FGHIJK" is selected from the internal memory output data 141 "FGHIJKLM", and "DE" which is a portion of the read data of the previous cycle is selected from the buffer output data 151. As a result, "FGHIJKDE" is output from the selector 160. This data is rotated by the rotator 170 as in the previous cycle, and the resultant "DEFGHIJK" is output as the rotator output data 171 and is transferred via the bus interface B 130 to the transfer destination device.

By repeatedly performing this operation to generate write data, write data can be output every cycle even when transfer source addresses and transfer destination addresses have different byte alignments, resulting in high-speed DMA transfer.

Note that, when transfer source addresses and transfer destination addresses have the same byte alignment, the selector 160 invariably selects data input from the internal memory output data 141, and the rotator 170 outputs input data without rotating the input data. Since the buffer 150 is not used, power consumption can be suppressed by controlling clock supply.

Figure 3:
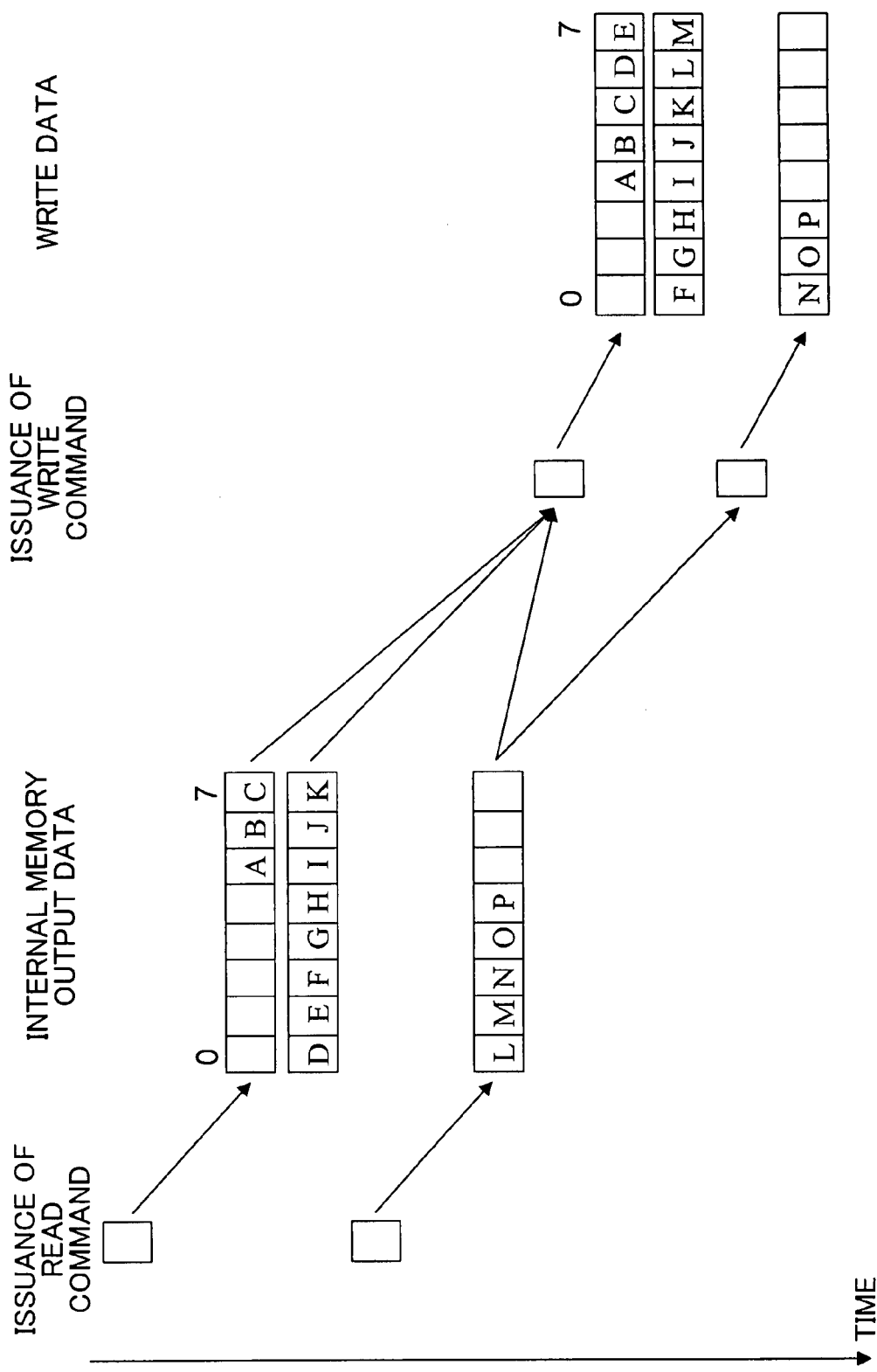
FIG. 3 is a timing flow diagram for describing an example in which issuance size adjustment is not performed when transfer source addresses and transfer destination addresses have different byte alignments, in Embodiment 1 of the present invention.

Next, issuance size adjustment in the DMA transfer control apparatus 100 of this embodiment when transfer source addresses and transfer destination addresses have different byte alignments will be described. If it is assumed that a read size and a write size are determined only based on the transfer size 111 set in the register 110, a command is issued which causes the number of times of transfer to be the same between in a read operation and in a write operation. However, assuming that transfer source addresses and transfer destination addresses have different byte alignments, even if the number of times of transfer is the same between in a read operation and in a write operation, a data size which is effective for transfer is not invariably the same. When the effective data size is smaller in a read operation than in a write operation, it is necessary to issue a write command after a read command is issued the number of times of transfer in a read operation which is larger than the number of times of transfer in a write operation. In many systems, the number of times of transfer which access can be performed with a single command is prescribed, depending on the protocol or the like of a bus or a transfer device. In such a case, it is necessary to issue a write command after executing a read command two times. An example will be shown in FIG. 3. In FIG. 3, it is assumed that the number of times of transfer which access can be performed with a single command is prescribed as up to two. In this case, a full set of data required for a write operation is obtained only after data is obtained with a second read command. In other words, since a write command is issued after a full set of data required is obtained, transfer is slow as compared to when transfer source addresses and transfer destination addresses have the same byte alignment.

Figure 4:
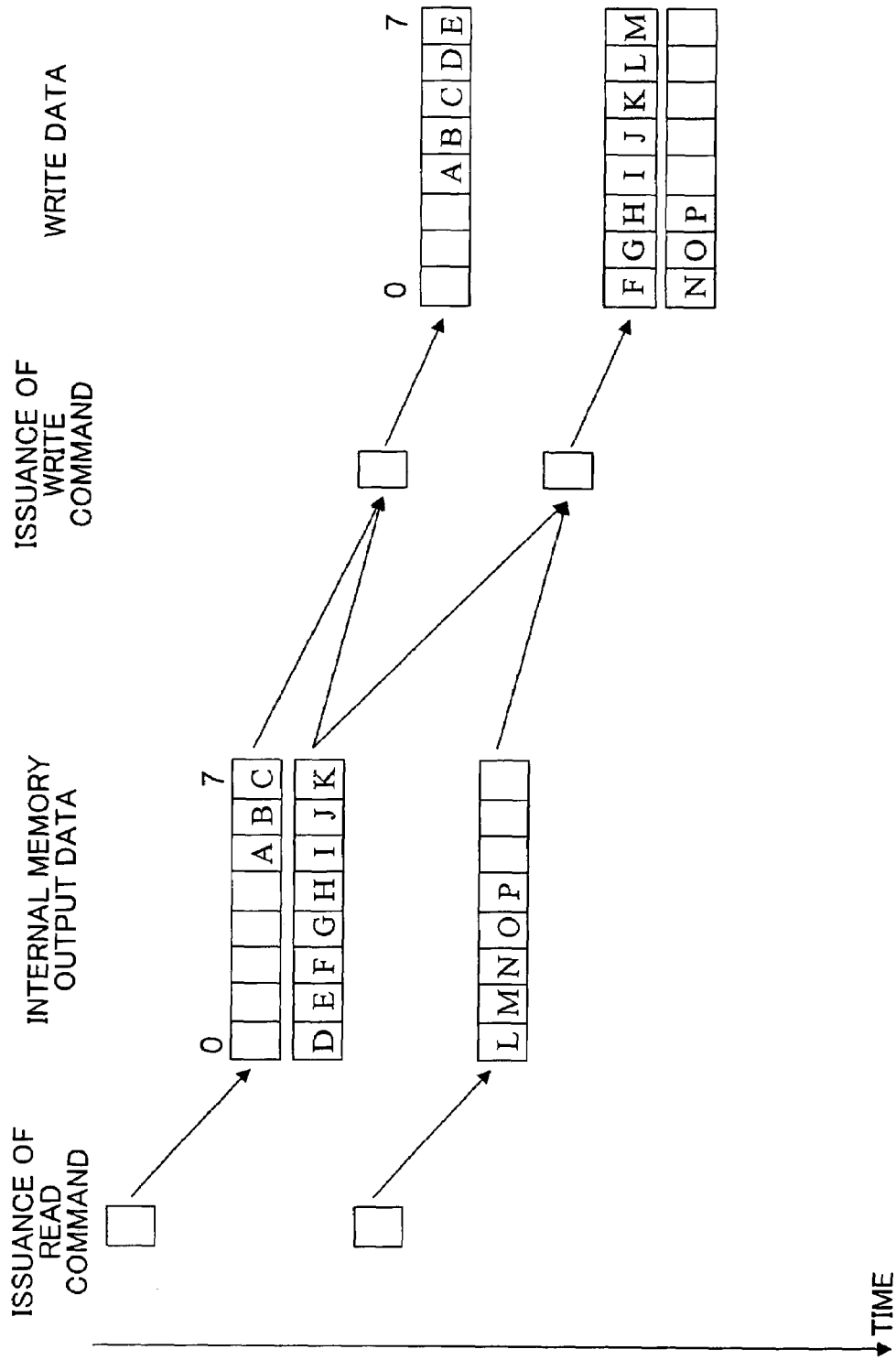
FIG. 4 is a timing flow diagram for describing an example in which issuance size adjustment is performed when transfer source addresses and transfer destination addresses have different byte alignments, in Embodiment 1 of the present invention.

To avoid this, according to the DMA transfer control apparatus of the present invention, in the above-described situation, a write transfer command in which the number of times of transfer is reduced by one is issued with timing when a single read command is completed. An example in this case will be described with reference to FIG. 4. A condition for the number of times of transfer is the same as that described above. Although the number of times of transfer in a write operation can be originally up to two, by setting the number of times of transfer in a first write operation to be one, write data can be written immediately after first read data is obtained.

By adjusting the transfer size in this manner, the arrival of write data can be caused to be earlier than when the number of times of transfer in a write operation is not adjusted, thereby making it possible to increase the transfer rate. Also, since a write operation is performed earlier, it is possible to prevent excessive data accumulation in the internal memory and prevent an error in a read operation caused by insufficiency of free space of the internal memory.

Figure 5:
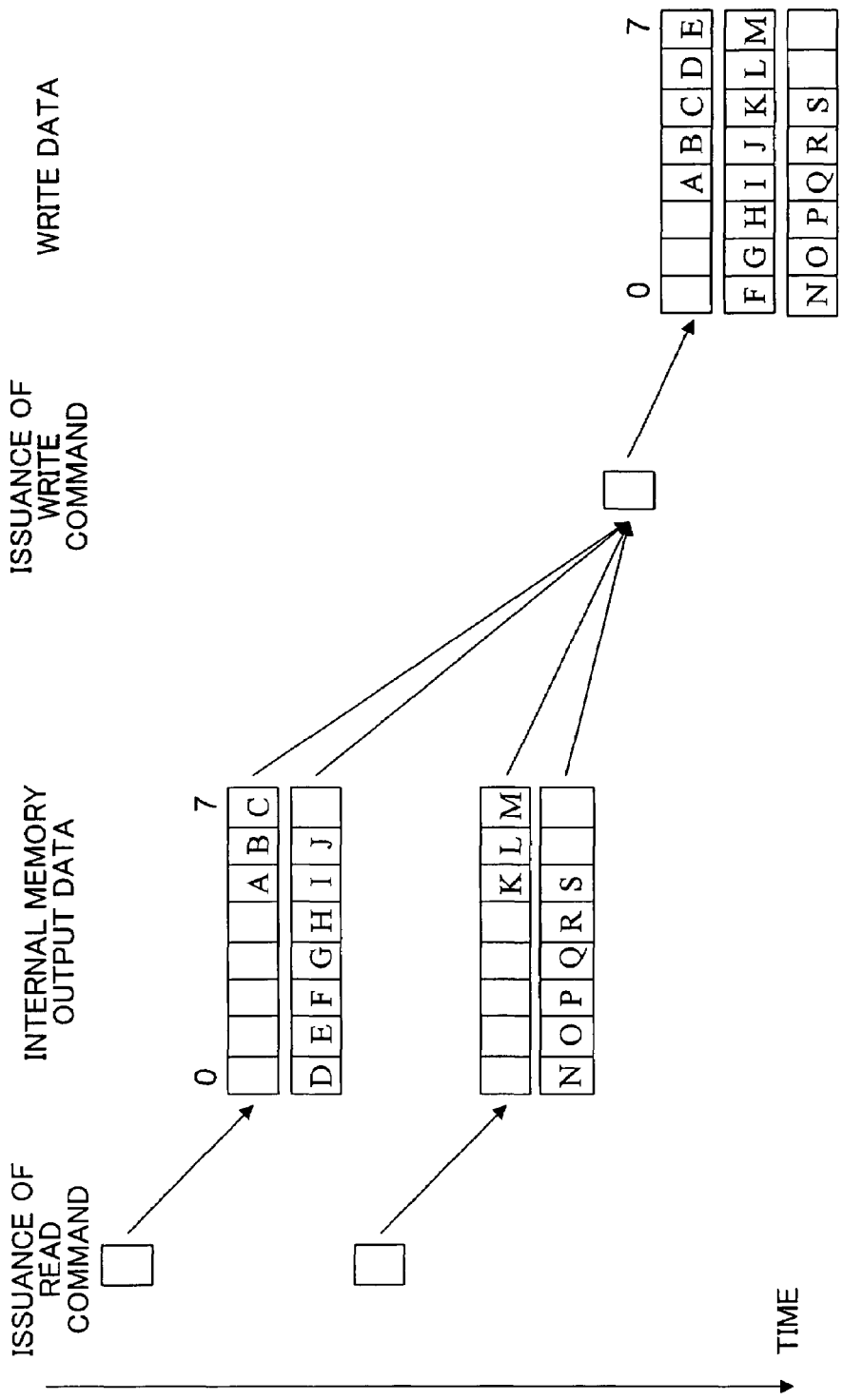
FIG. 5 is a timing flow diagram for describing an example in which issuance size adjustment is performed when data transfer of a discontinuous area is performed in a read operation, in Embodiment 1 of the present invention.

Next, issuance size adjustment in the DMA transfer control apparatus 100 of this embodiment when data transfer is performed with respect to a discontinuous area will be described. When data is read from a discontinuous area, a command is executed so that transfer is split at a discontinuous portion of the data. Specifically, a command is issued in which a transfer size is set so that data before the discontinuous portion is transferred, and the next command is issued in which an address and a size are set so that data is transferred from the next continuous area. An example when read data in a discontinuous area is handled will be shown in; FIG. 5. The number of times of transfer which access can be performed with a single command is assumed to be prescribed as up to four in accordance with a bus protocol. In this case, by dividing a transfer size of 0x13 by a transfer source data width of 0x8 bytes, the number of times of transfer required in a read operation is calculated as three. However, a continuous area read size is 0x0a. Therefore, the continuous area read size of 0x0a is divided by the transfer source data width of 0x8 bytes, and a read command is issued in which the resultant value of 2 is set as the number of times of transfer in a first read operation. In a second read command, the number of times of transfer is two since the transfer size of the remainder is 0x09. Note that, in the second issued command, the address is set to designate the head of the next continuous area. Note that the timing of issuance of a write command is not limited to the example shown in FIG. 5.

Figure 6:
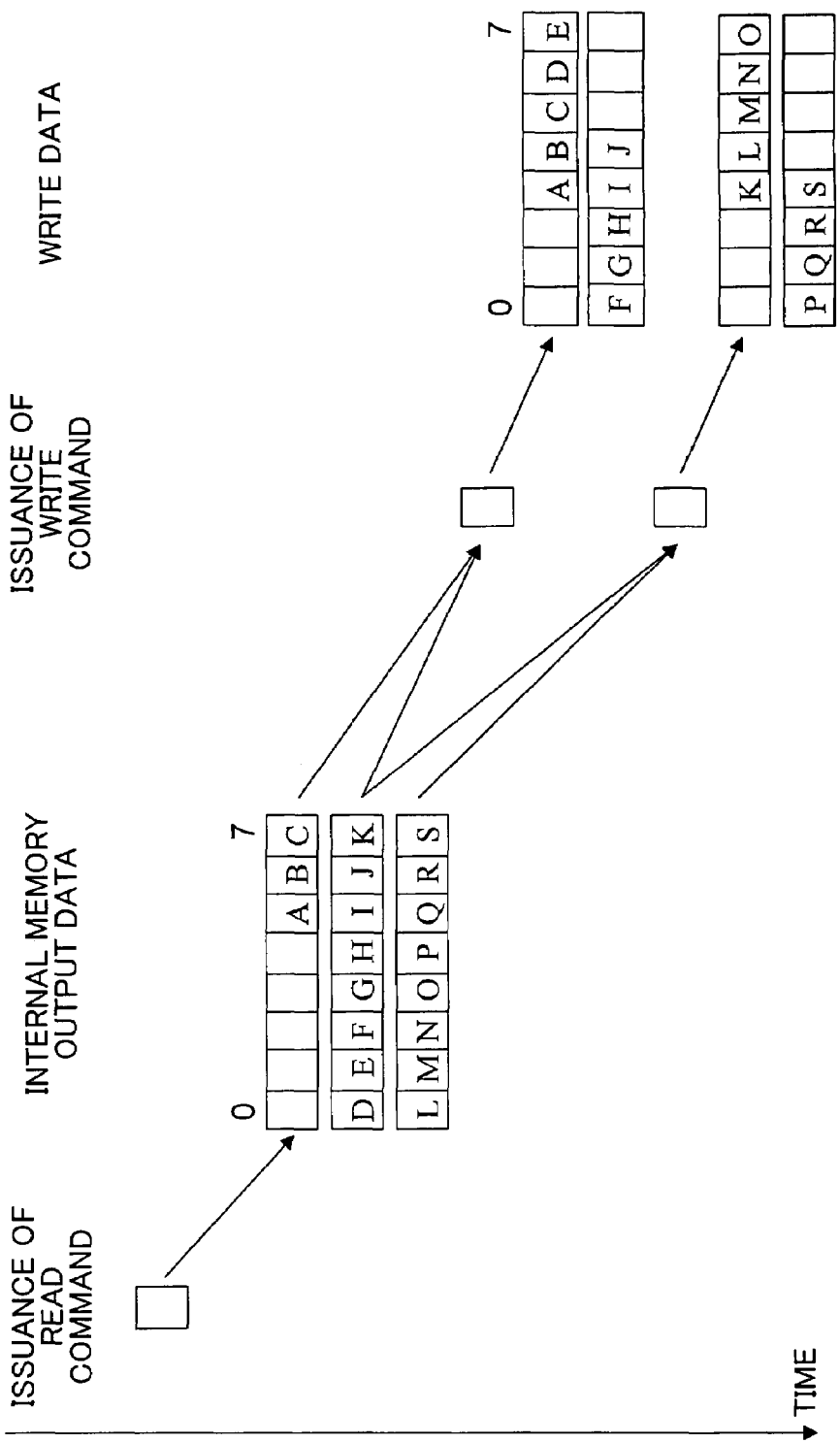
FIG. 6 is a timing flow diagram for describing an example in which issuance size adjustment is performed when data transfer of a discontinuous area is performed in a write operation, in Embodiment 1 of the present invention.

Also, when write data in a discontinuous area is handled, similar issuance size adjustment is performed. FIG. 6 shows an exemplary write operation. In FIG. 6, the number of times of transfer which access can be performed with a single command is assumed to be prescribed as up to four in accordance with a bus protocol. In a write operation, by dividing the transfer size of 0x13 by the transfer source data width of 0x8 bytes, the number of times of transfer required in the write operation is calculated as three. However, a continuous area write size is 0x0a. Therefore, the continuous area write size of 0x0a is divided by the transfer source data width of 0x8 bytes, and a write command is issued in which the resultant value of 2 is set as the number of times of transfer in a first write operation. In a second write command, the number of times of transfer is two since the transfer size of the remainder is 0x09. Note that, in the second issued command, the address is set to designate the head of the next continuous area.

Figure 7:
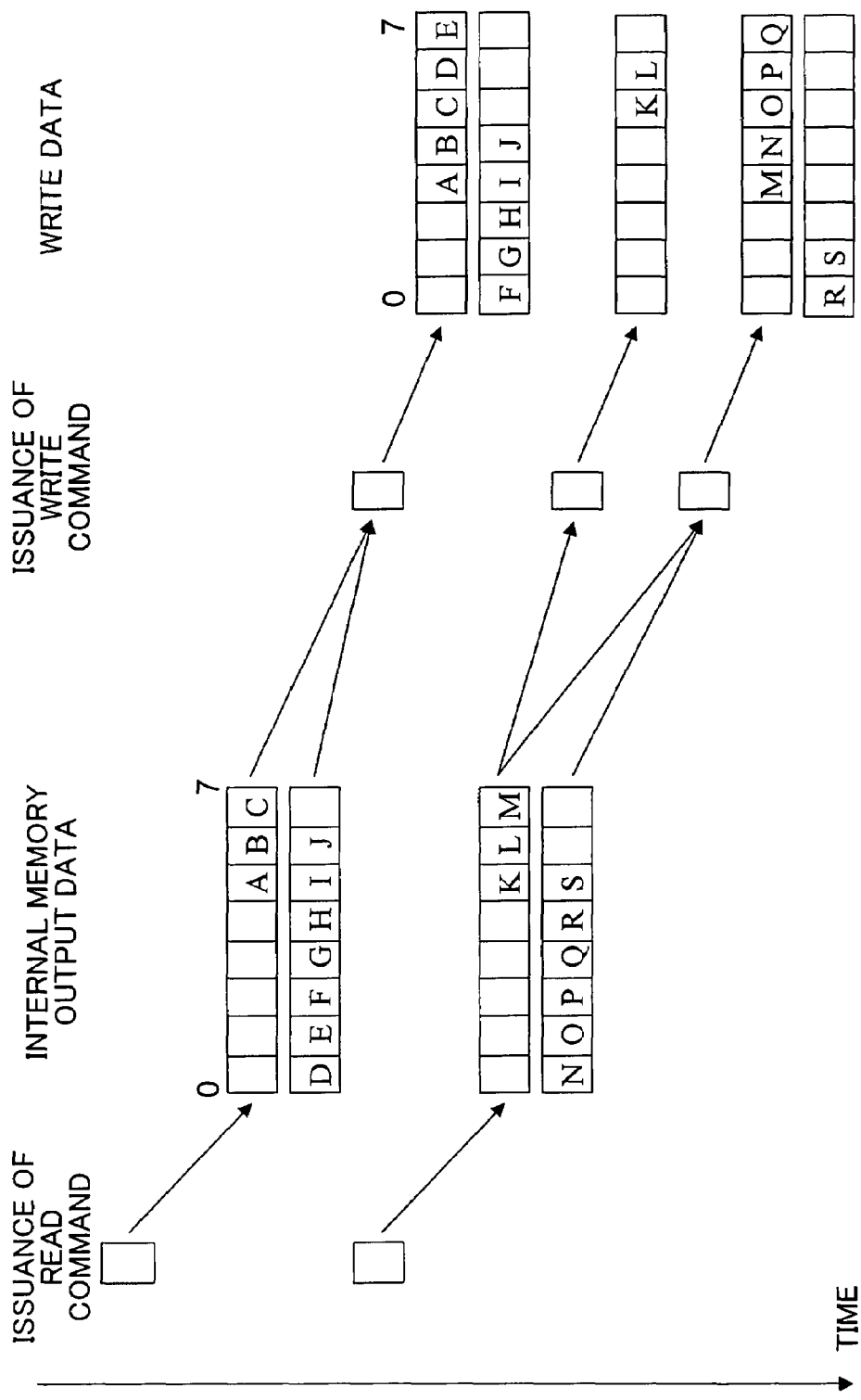
FIG. 7 is a timing flow diagram for describing an example in which issuance size adjustment is performed when data transfer of a discontinuous area is performed in a read operation and in a write operation, in Embodiment 1 of the present invention.

An exemplary case where read data and write data in a discontinuous area are simultaneously handled is shown in FIG. 7. In FIG. 7, the number of times of transfer which access can be performed with a single command is assumed to be prescribed as up to four in accordance with a bus protocol. The read data is obtained by the above-described method for reading discontinuous area data. In a write operation, by dividing the transfer size of 0x13 by the transfer source data width of 0x8 bytes, the number of times of transfer required in the write operation is calculated as three. However, the continuous area read size is 0x0a. In order to address the discontinuous area to be read, the continuous area read size of 0x0a is divided by the transfer source data width of 0x8 bytes, and a write command is issued in which the resultant value of 2 is set as the number of times of transfer in a first write operation. By subtracting the previous transfer size of 0x0a from a continuous area write size of 0x0c, the remainder of the continuous area write size is calculated as 0x02. Therefore, the write data is here sectioned so as to address the write discontinuous area, and the number of times of transfer is set as one in a second write command to be issued. In a third write operation, although a value obtained by subtracting the size 0x0c of the data already transferred from the transfer size of 0x13 is 0x07, the number of times of transfer is set as two for the purpose of the alignment of issued addresses.

Note that these descriptions are only for illustrative purposes, and the timing and the number of times of transfer in read and write operations are not limited to this. By adjusting a transfer size and a transfer address in the above-described manner, data in a discontinuous area can also be handled in a manner similar to that for data in a continuous area without requirement of a particular circuit.

Embodiment 2

Figure 8:
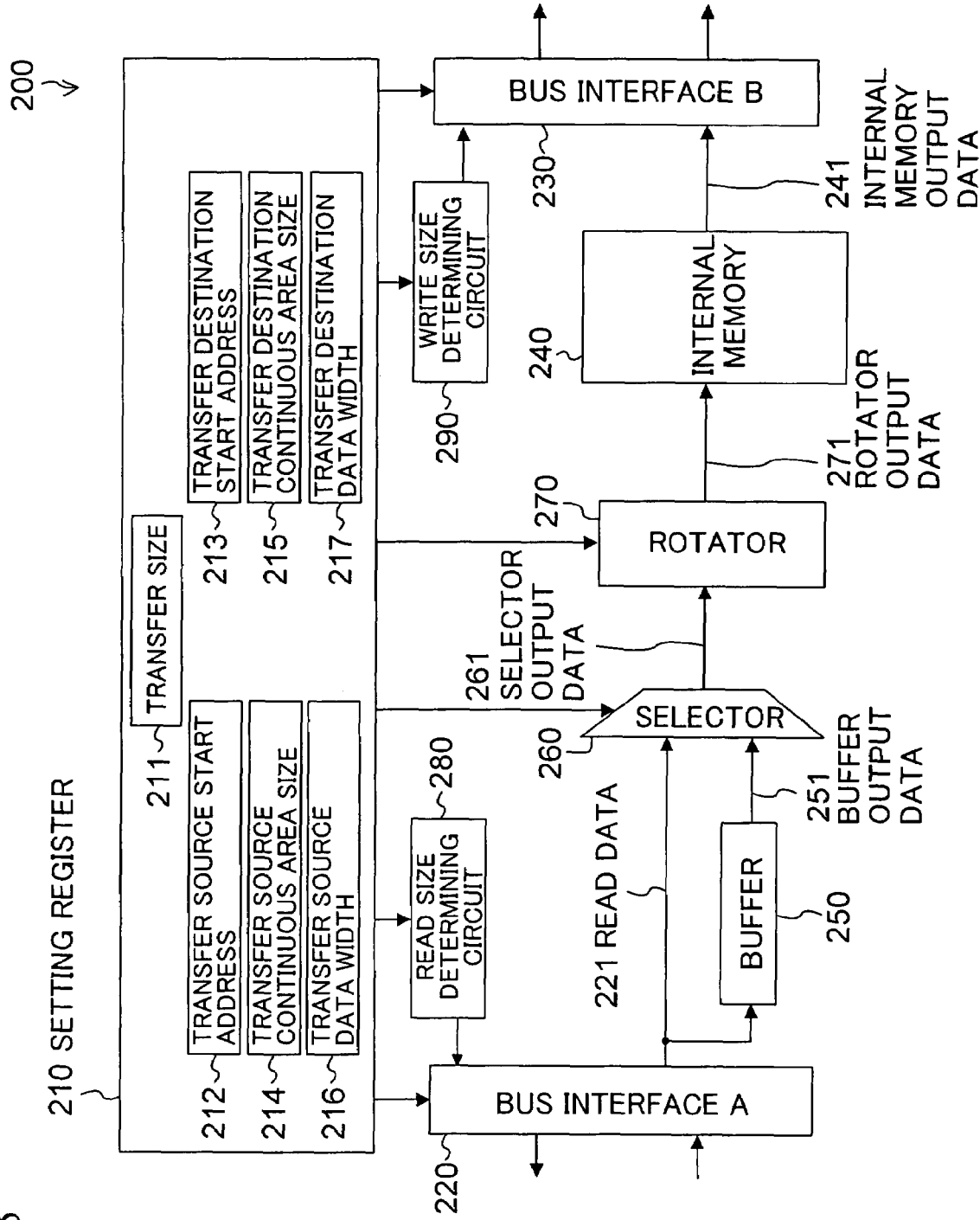
FIG. 8 is a block diagram schematically showing a DMA transfer control apparatus according to Embodiment 2 of the present invention.

FIG. 8 is a block diagram schematically showing a DMA transfer control apparatus 200 according to Embodiment 2 of the present invention. In the DMA transfer control apparatus 200 of this embodiment, a bus to which a transfer source device is connected is connected to a bus interface A 220, and a bus to which a transfer destination device is connected is connected to a bus interface B 230.

The DMA transfer control apparatus 200 has the bus interface A 220, a buffer 250 which receives read data 221 output from the bus interface A 220, a selector 260 which receives the read data 221 and buffer output data 251 output from the buffer 250, a rotator 270 which receives selector output data 261 output from the selector 260, an internal memory 240 which receives rotator output data 271 output from the rotator 270, and the bus interface B 230 which receives internal memory output data 241 output from the internal memory 240.

The DMA transfer control apparatus 200 also has a setting register 210 in which a transfer size 211, a transfer source start address 212, a transfer destination start address 213, a transfer source continuous area size 214, a transfer destination continuous area size 215, a transfer source data width 216, and a transfer destination data width 217 are set.

The DMA transfer control apparatus 200 also has a read size determining circuit 280 and a write size determining circuit 290.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 200 of this embodiment will be described. The read data 221 which is read from the transfer source device via the bus interface A 220 is input to the selector 260 and the buffer 250 simultaneously. The buffer 250 temporarily stores the data before outputting the data to the selector 260. The selector 260 selects one of the two pieces of input data per byte, depending on a difference obtained by subtracting a set value of the transfer source start address 212 from a set value of the transfer destination start address 213. Data output from the selector 260 is input to the rotator 270. The rotator 270 determines the number of rotation stages, depending on the address difference, and rotates the input data, depending on the determined number of rotation stages. Data output from the rotator 270 is temporarily stored in the internal memory 240 so as to execute burst transfer. After an appropriate size of data is accumulated in the internal memory 240, the data is read from the internal memory 240. The data output from the internal memory 240 is transferred via the bus interface B 230 to the transfer destination device.

Figure 9:
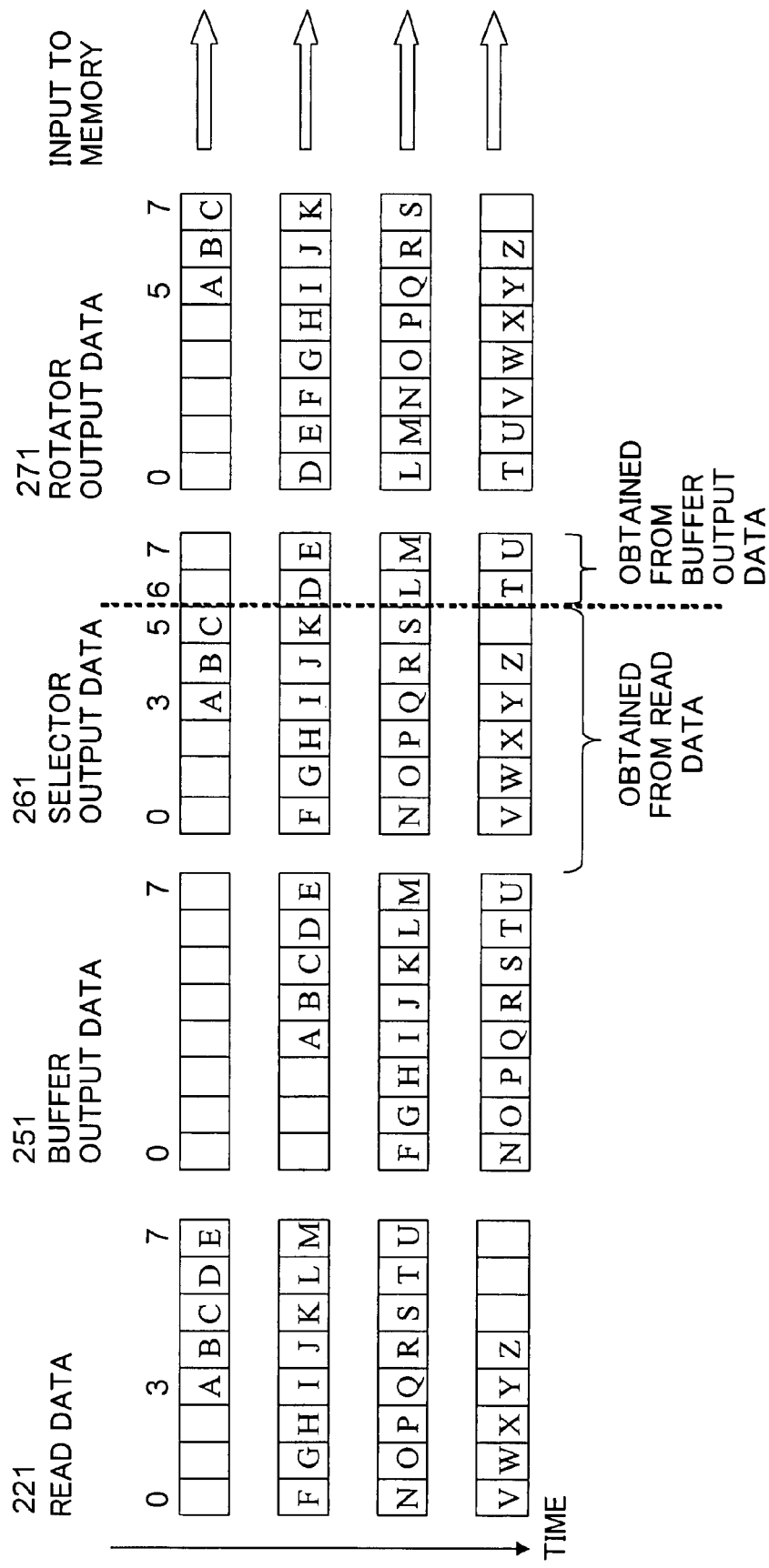
FIG. 9 is a timing flow diagram for describing an exemplary transfer operation when transfer source addresses and transfer destination addresses have different byte alignments, in Embodiment 2 of the present invention.

An exemplary transfer operation when transfer source addresses and transfer destination addresses have different byte alignments will be described with reference to FIG. 9. A transfer bus width is 8 bytes. The three lowest bits of a transfer source start address have a value of 3, and the three lowest bits of a transfer destination start address have a value of 5. Thus, in both the transfer source and the transfer destination, the addresses are not aligned with the transfer bus width, and valid data starts from a halfway byte in leading data.

Initially, leading read data "xxxABCDE" is transmitted via the bus interface A 220 to the buffer 250 and the selector 260. In the selector 260, selection is performed per byte, depending on a difference obtained by subtracting the three lowest bits of the set value of the transfer source start address 212 from the three lowest bits of the set value of the transfer destination start address 213. In this example, since the difference is 2, the last two bytes of the eight bytes are selected from the buffer output data 251, the remaining bits are selected from the internal memory output data 241. Specifically, the zeroth to fifth bytes are selected from the internal memory output data 241, while the sixth and seventh bytes are selected from the buffer output data 251. Therefore, from the leading read data, only "xxxABC" required for generation of leading write data is selected, and "DE" is not selected. The selector output data 261 is input to the rotator 270, in which the selector output data 261 is rotated in the right direction by the address difference. Specifically, the input "xxxABCxx" is rotated by 2 in the right direction, and the resultant "xxxxx-ABC" is output and transferred to the internal memory 240. The read data 221 which is input to the buffer 250 is temporarily stored.

In the next cycle, the next read data "FGHIJKLM" is output via the bus interface A 220 to the buffer 250 and the selector 260 as in the previous cycle. In the selector 260, the bytes are split between the fifth byte and the sixth byte as in the previous cycle, "FGHIJK" is selected from the internal memory output data 241 "FGHIJKLM", and "DE" which is a portion of the read data of the previous cycle is selected from the buffer output data 251. As a result, "FGHIJKDE" is output from the selector 260. This data is rotated by the rotator 270 as in the previous cycle, and the resultant "DEFGHIJK" is output and transferred as rotator output data 271 to the internal memory 240.

By repeatedly performing this operation to input read data to the internal memory 260, read data can be received every cycle even when transfer source addresses and transfer destination addresses have different byte alignments. Also, since appropriate write data is stored in the internal memory 260, depending on the transfer source address, write data can be DMA-transferred at a high rate.

Note that, when transfer source addresses and transfer destination addresses have the same byte alignment, the selector 260 invariably selects data input from the read data 221, and the rotator 270 outputs input data without rotating the input data. Since the buffer 250 is not used, power consumption can be suppressed by controlling clock supply.

Also, in the DMA transfer control apparatus 200 of this embodiment, issuance size adjustment can be performed. The issuance size adjustment is performed as described in Embodiment 1 both when transfer source addresses and transfer destination addresses have different byte alignments and when data in a discontinuous area is transferred.

Next, regarding the DMA transfer control apparatus 200 of this embodiment, a case where read transfer is performed using a data width which is smaller than the transfer bus width will be described. The buffer 250 has a function of writing only valid read data. It can be determined which byte is written, using a transfer source start address and a transfer data width. Valid read data 221 is successively accumulated in the buffer 250. When data has been read in an amount corresponding to the transfer bus width, the data is stored into the internal memory 240. The storage is not performed until read data has been accumulated.

Figure 10:
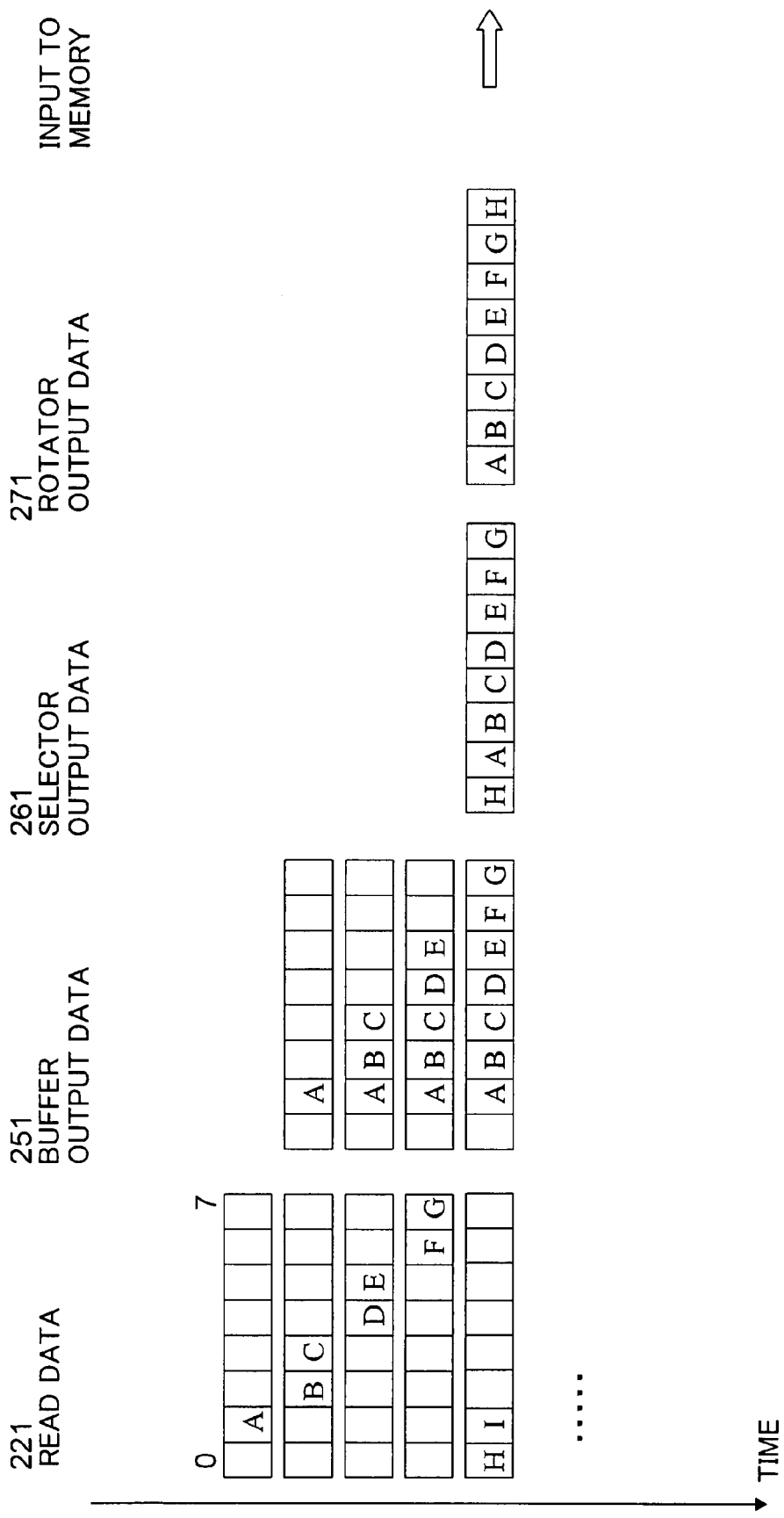
FIG. 10 is a timing flow diagram for describing an exemplary transfer operation when read transfer is performed using a data width smaller than a transfer bus width, in Embodiment 2 of the present invention.

An exemplary operation will be described with reference to FIG. 10. Regarding the read data 221 from the transfer source device, when first read data "xAxxxxxx" is read, "A" at a lower address 0x1 is written into the buffer 250. In this case, a write operation is not performed for the other bytes. Note that a write operation either may or may not be performed for "x" at a lower address 0x0. In the next cycle, when read data "xxBCxxxx" is read, "BC" at lower addresses 0x2 and 0x3 is written into the buffer 250. In this case, a write operation is not performed for the other bytes, which therefore hold the previous values, so that the buffer 250 has data "xABCxxxx". By repeatedly performing this per cycle, the data of the buffer 250 eventually becomes "xABCDEFG". Next, when "HIxxxxxx" of the read data 221 is read, the selector 260 selects "H" of the read data 221 and "ABCDEFG" of the buffer data 251 based on a difference between a transfer source start address and a transfer destination start address, so that "HABCDEFG" is output. The selector output data 261 is input to the rotator 270. The rotator 270 rotates data input based on the address difference and outputs the resultant "ABCDEFGH", and this data is stored into the internal memory 240.

By handling read data in this manner, even when read transfer is performed using a data width smaller than the transfer bus width, it is possible to store data which is accumulated to the full transfer bus width into the internal memory 240, resulting in efficient use of the internal memory 240. Note that, when write transfer is performed using a data width smaller than the transfer bus width, write data is divided and written over a plurality of cycles, and in the other respects, the data transfer method of the DMA transfer control apparatus 200 of this embodiment is the same as that which is used when write transfer is performed using the same data width as the transfer bus width.

Embodiment 3

Figure 11:
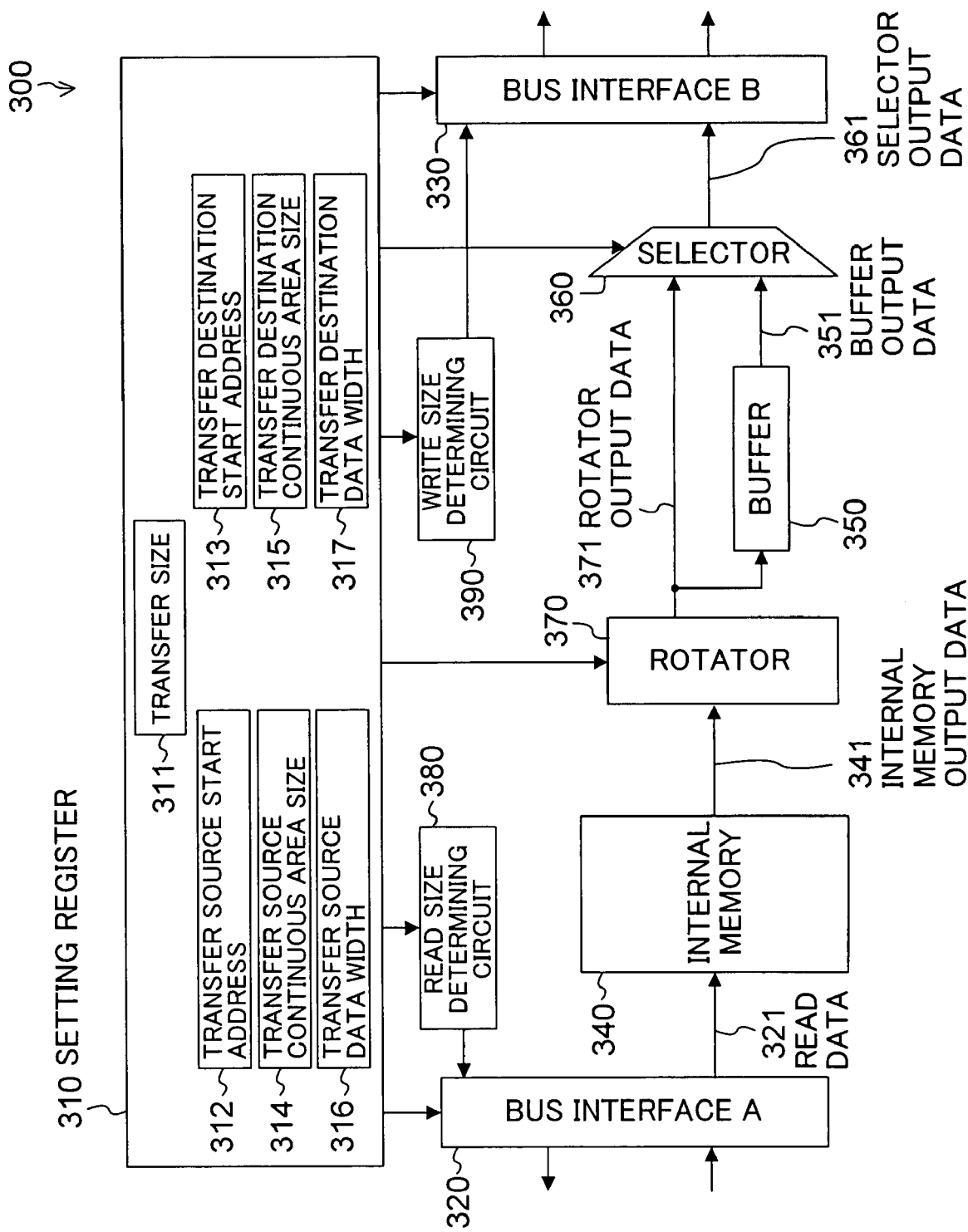
FIG. 11 is a block diagram schematically showing a DMA transfer control apparatus according to Embodiment 3 of the present invention.

FIG. 11 is a block diagram schematically showing a DMA transfer control apparatus 300 according to Embodiment 3 of the present invention. In the DMA transfer control apparatus 300 of this embodiment, a transfer source device or a bus to which the transfer source device is connected is connected to a bus interface A 320, and a transfer destination device or a bus to which the transfer destination device is connected is connected to a bus interface B 330.

The DMA transfer control apparatus 300 has the bus interface A 320, an internal memory 340 which receives read data 321 output from the bus interface A 320, a rotator 370 which receives internal memory output data 341 output from the internal memory 340, a buffer 350 which receives rotator output data 371 output from the rotator 370, a selector 360 which receives the rotator output data 371 and buffer output data 351 output from the buffer 350, and the bus interface B 130 which receives selector output data 361 output from the selector 360.

The DMA transfer control apparatus 300 also has a setting register 310 in which a transfer size 311, a transfer source start address 312, a transfer destination start address 313, a transfer source continuous area size 314, a transfer destination continuous area size 315, a transfer source data width 316, and a transfer destination data width 317 are set.

The DMA transfer control apparatus 300 also has a read size determining circuit 380 and a write size determining circuit 390.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 300 of this embodiment will be described. The read data 321 which is read from the transfer source device via the bus interface A 320 is temporarily stored in the internal memory 340 so as to execute burst transfer. After an appropriate size of data is accumulated in the internal memory 340, the data is read from the internal memory 340. The data output from the internal memory 340 is input to the rotator 370. The rotator 370 determines the number of rotation stages, depending on an address difference obtained by subtracting a set value of the transfer source start address 312 from a set value of the transfer destination start address 313, and rotates the input data, depending on the determined number of rotation stages. The rotator output data 371 is input to the selector 360 and the buffer 350 simultaneously. The buffer 350 temporarily stores the data before outputting the data to the selector 360. The selector 360 selects one of the two pieces of input data per byte, depending on the address difference. Data output from the selector 360 is transferred via the bus interface B 330 to the transfer destination device.

Figure 12:
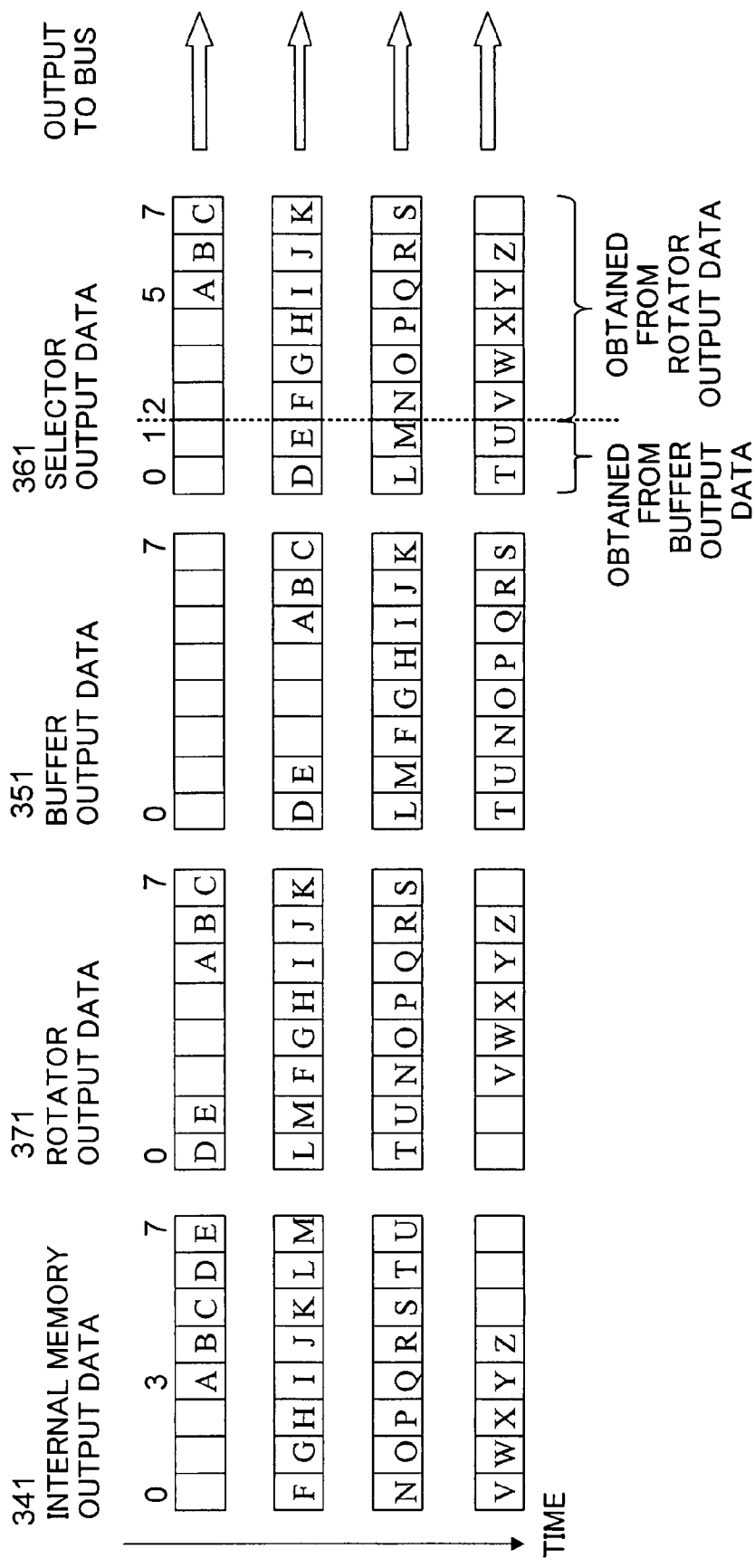
FIG. 12 is a timing flow diagram for describing an exemplary transfer operation when transfer source addresses and transfer destination addresses have different byte alignments, in Embodiment 3 of the present invention.

An exemplary transfer operation when transfer source addresses and transfer destination addresses have different byte alignments will be described with reference to FIG. 12. A transfer bus width is 8 bytes. The three lowest bits of a transfer source start address have a value of 3, and the three lowest bits of a transfer destination start address have a value of 5. Thus, in both the transfer source and the transfer destination, the addresses are not aligned with the transfer bus width, and valid data starts from a halfway byte in leading data.

Initially, read data is stored via the bus interface A 320 into the internal memory 340. After data required for generation of write data is stored, the data is read from the internal memory 340. Leading read data "xxxABCDE" is output to the rotator 370. In the rotator 370, rotation is performed, depending on a difference obtained by subtracting the three lowest bits of the set value of the transfer source start address 312 from the three lowest bits of the set value of the transfer destination start address 313. In this example, since the difference is 2, the input data is rotated by 2 in the right direction, and the resultant "DExxxABC" is output. The rotator output data 371 is input to the buffer 350 and the selector 360. In the selector 360, selection is performed per byte, depending on the address difference. Since selection is performed for data which has already been rotated, in this example the first two bytes of the 8 bytes are selected from the buffer output data 351 in accordance with the address difference of 2 and the remainder is selected from the rotator output data 371. Specifically, the zeroth and first bytes are selected from the buffer output data 351, and the second to seventh bytes are selected from the rotator output data 371, so that, from the leading read data, only "xxxABC" required for generation of leading write data is selected and "DE" is not selected. The selector output data 361 is transferred via the bus interface B 330 to the transfer destination device. The rotator output data 371 which is input to the buffer 350 is temporarily stored.

In the next cycle, when the next read data "FGHIJKLM" is output from the internal memory 340, the data is rotated by the rotator 370 as in the previous cycle, so that "LMFGHIJK" is output. This data is input to the buffer 350 and the selector 360. In the selector 360, the bytes are split between the first byte and the second byte, so that "FGHIJK" is selected from the rotator output data 371 "LMFGHIJK", and "DE" which is a portion of the read data of the previous cycle is selected from the buffer output data 351. As a result, "DEFGHIJK" is output from the selector 360. This data is transferred via the bus interface B 330 to the transfer destination device.

By repeatedly performing this operation to generate write data, write data can be output every cycle even when transfer source addresses and transfer destination addresses have different byte alignments, resulting in high-speed DMA transfer.

Note that, when transfer source addresses and transfer destination addresses have the same byte alignment, the rotator 370 outputs input data without rotating the input data. The selector 360 invariably selects input data from the rotator output data 371. Since the buffer 350 is not used, power consumption can be suppressed by controlling clock supply.

Also, in the DMA transfer control apparatus 300 of this embodiment, issuance size adjustment can be performed. The issuance size adjustment is performed as described in Embodiment 1 both when transfer source addresses and transfer destination addresses have different byte alignments and when data in a discontinuous area is transferred.

Next, regarding the DMA transfer control apparatus 300 of this embodiment, a method for efficiently transferring data including in a discontinuous area size will be described. In the rotator 370, in order to support data transfer including a discontinuous area size, the number of rotation stages is determined, taking into consideration a continuous transfer data size as well as a difference between a transfer source start address and a transfer destination start address. Also, only valid data bytes can be written into the buffer 350, which can accumulate data.

Figure 13:
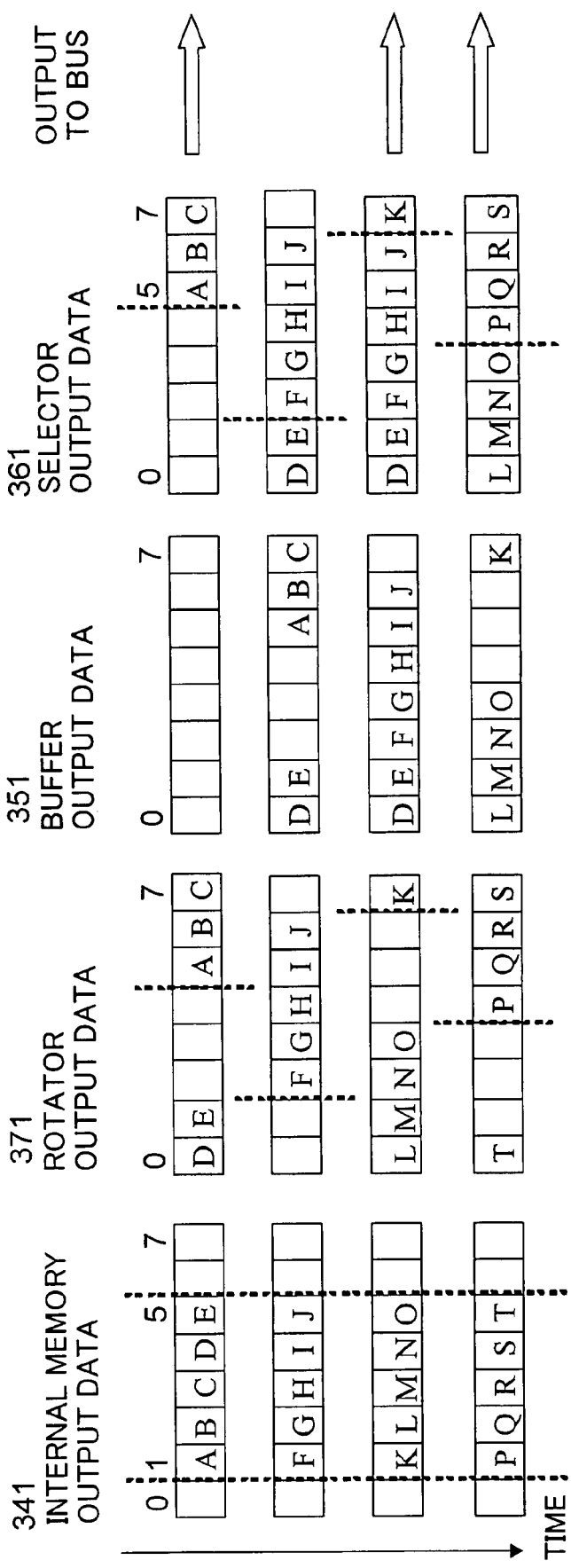
FIG. 13 is a timing flow diagram for describing an exemplary transfer operation in which data transfer of a discontinuous area is performed in a read operation, in Embodiment 3 of the present invention.

FIG. 13 shows how write data in a continuous area is generated from read data including a discontinuous area size before being transferred. The read data 321 as it is discontinuous data is stored into the internal memory 340. Initially, leading read data "xABCDExx" output from the internal memory 340 is input to the rotator 370. Since a difference obtained by subtracting the three lowest bits of a set value of the transfer source start address 312 from the three lowest bits of a set value of the transfer destination start address 313 is 4, the rotator 370 rotates the leading read data "xABCDExx" by 4 in the right direction, i.e., the rotator output data 371 is "DExxxABC". This data is input to the buffer 350 and the selector 360. In the selector 360, since the bytes are split between the fourth byte and the fifth byte in accordance with the transfer destination start address, only "ABC" required for generation of leading write data is selected from the leading read data. The selector output data 361 is transferred via the bus interface B 330 to the transfer destination device. The rotator output data 371 which is input to the buffer 350 is temporarily stored.

In the next cycle, the next read data "xFGHIJxx" is input from the internal memory 340 to the rotator 370. The number of rotation stages is 9 which is obtained by adding a transfer source continuous area size of 5 to the value of 4 in the previous cycle. When the number of rotation stages is divided by the transfer bus width of 8, the remainder is 1. The read data is rotated by 1 in the right direction. The rotator output data 371, which is "xxFGHIJx", is input to the buffer 350 and the selector 360. In the buffer 350, only valid bytes "FGHIJ" are written, while the other data bytes are accumulated as they are. Therefore, in the next cycle, the buffer output data 351 is "DEFGHIJx". In the selector 360, in order to designate a select byte, 2 is used which is the remainder when 10 which is the sum of 5 in the previous cycle and the transfer source continuous area size of 5 is divided by the transfer bus width of 8, and the bytes to be selected are split between the first byte and the second byte, so that the selector output data 361 is "DEFGHIJx". However, in this cycle, read data required for generation of the next write data is insufficient, so that a write operation is not performed.

In the next cycle, the next read data "xKLMNOxx" is input from the internal memory 340 to the rotator 370. The number of rotation stages is 6 which is obtained by adding the transfer source continuous area size of 5 to a value of 1 in the previous cycle. The read data "xKLMNOxx" is rotated by 6 in the right direction. The rotator output data 371, which is "LMNOxxxK", is input to the buffer 350 and the selector 360. In the selector 360, the transfer source continuous area size of 5 is added to 2 which is the select byte place in the previous cycle to obtain 7, and the bytes are split between the sixth byte and the seventh byte, so that the selector output data 361 is "DEFGHIJK". This data is transferred via the bus interface B 330 to the transfer destination device.

Thus, by converting read data including a discontinuous area into data suitable for a write operation, such as continuous area data, data including a different discontinuous area, or the like, it is possible to perform high-speed DMA transfer which supports even read data including a discontinuous area. In addition, by adjusting the data select byte of the selector or the number of rotation stages of the rotator in a similar manner, write data including a discontinuous area or both write data and read data including a discontinuous area can be transferred.

Embodiment 4

Figure 14:
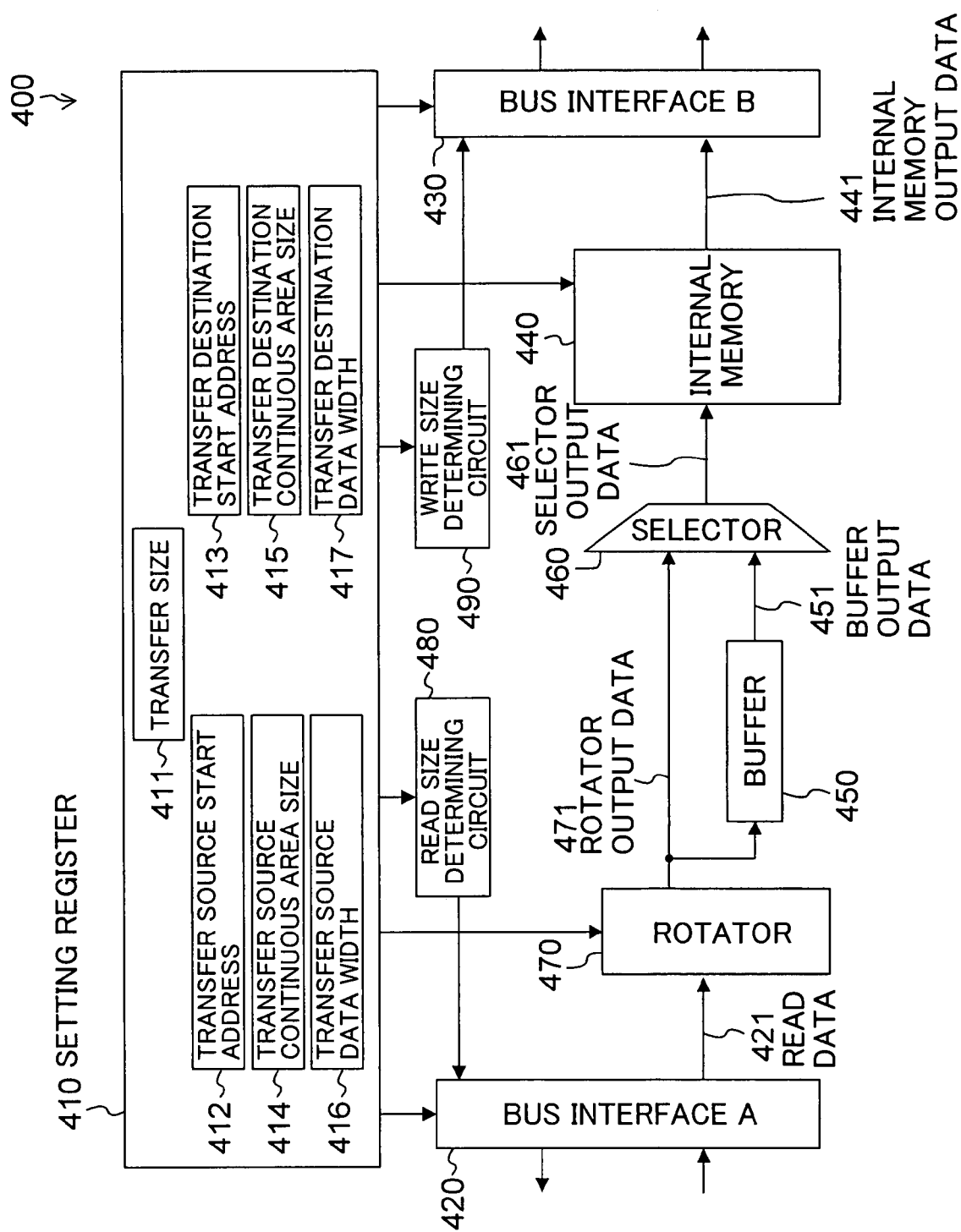
FIG. 14 is a block diagram schematically showing a DMA transfer control apparatus according to Embodiment 4 of the present invention.

FIG. 14 is a block diagram schematically showing a DMA transfer control apparatus 400 according to Embodiment 4 of the present invention. In the DMA transfer control apparatus 400 of this embodiment, a transfer source device or a bus to which the transfer source device is connected is connected to a bus interface A 420, and a transfer destination device or a bus to which the transfer destination device is connected is connected to a bus interface B 430.

The DMA transfer control apparatus 400 has the bus interface A 420, a rotator 470 which receives read data 421 output from the bus interface A 420, a buffer 450 which receives rotator output data 471 output from the rotator 470, a selector 460 which receives the rotator output data 471 and buffer output data 451 output from the buffer 450, an internal memory 440 which receives selector output data 461 output from the selector 460, and the bus interface B 430 which receives internal memory output data 441 output from the internal memory 440.

The DMA transfer control apparatus 400 also has a setting register 410 in which a transfer size 411, a transfer source start address 412, a transfer destination start address 413, a transfer source continuous area size 414, a transfer destination continuous area size 415, a transfer source data width 416, and a transfer destination data width 417 are set.

The DMA transfer control apparatus 400 also has a read size determining circuit 480 and a write size determining circuit 490.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 400 of this embodiment will be described. The read data 421 which is read from the transfer source device via the bus interface A 420 is input to the rotator 470. The rotator 470 determines the number of rotation stages, depending on an address difference obtained by subtracting a set value of the transfer source start address 412 from a set value of the transfer destination start address 413, and rotates the input data, depending on the determined number of rotation stages. The rotator output data 471 is input to the selector 460 and the buffer 450 simultaneously. The buffer 450 temporarily stores the data before outputting the data to the selector 460. The selector 460 selects one of the two pieces of input data per byte, depending on the address difference. Data output from the selector 460 is temporarily stored in the internal memory 440 so as to execute burst transfer. After an appropriate size of data is accumulated in the internal memory 440, the data is read from the internal memory 440. The data output from the internal memory 440 is transferred via the bus interface B 430 to the transfer destination device.

Figure 15:
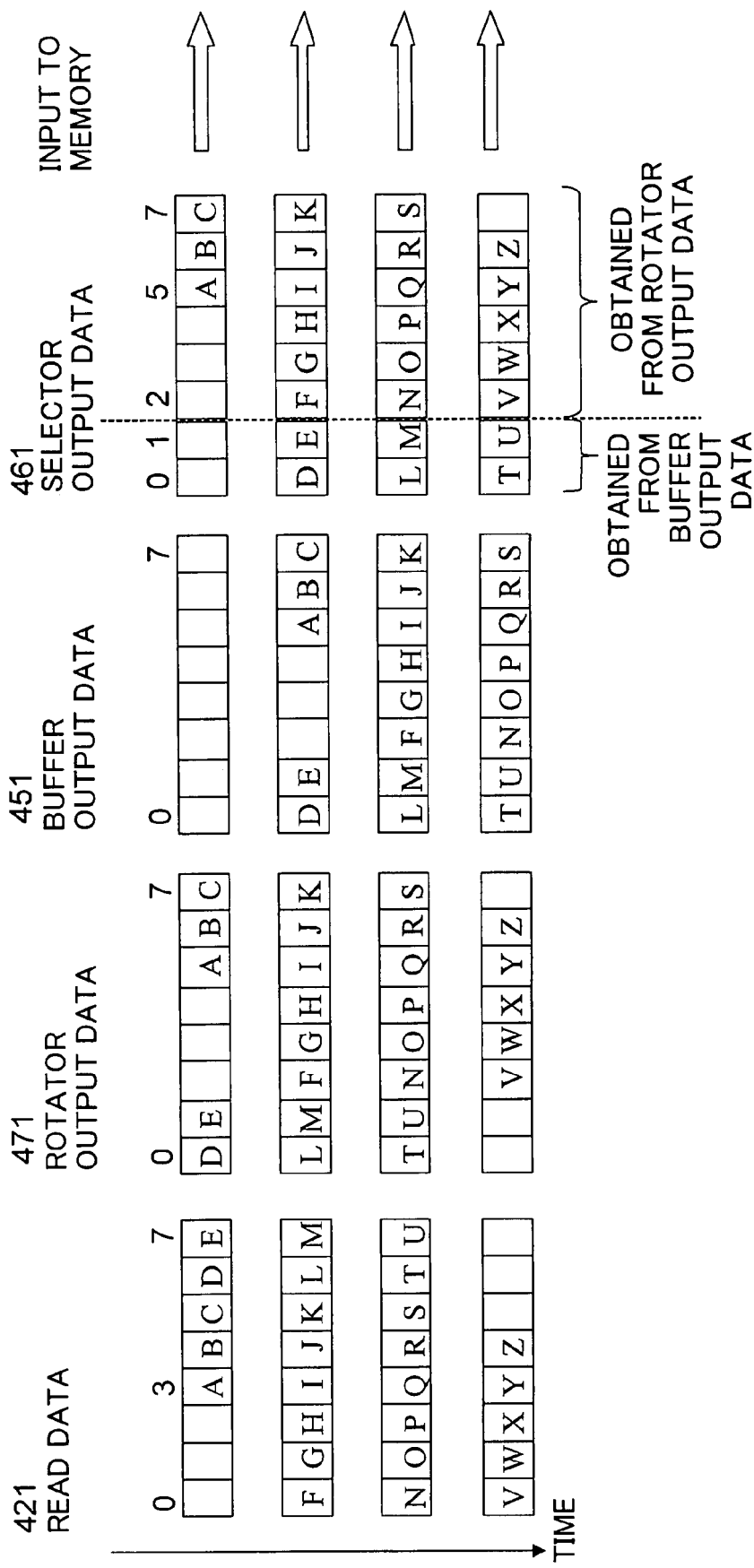
FIG. 15 is a timing flow diagram for describing an exemplary transfer operation when transfer source addresses and transfer destination addresses have different byte alignments, in Embodiment 4 of the present invention.

An exemplary transfer operation when transfer source addresses and transfer destination addresses have different byte alignments will be described with reference to FIG. 15. A transfer bus width is 8 bytes. The three lowest bits of a transfer source start address have a value of 3, and the three lowest bits of a transfer destination start address have a value of 5. Thus, in both the transfer source and the transfer destination, the addresses are not aligned with the transfer bus width, and valid data starts from a halfway byte in leading data.

Initially, leading read data "xxxABCDE" is input via the bus interface A 420 to the rotator 470. In the rotator 470, rotation is performed, depending on a difference obtained by subtracting the three lowest bits of the set value of the transfer source start address 412 from the three lowest bits of the set value of the transfer destination start address 413. In this example, since the difference is 2, the input data is rotated by 2 in the right direction, and the resultant "DExxxABC" is output. The rotator output data 471 is input to the buffer 450 and the selector 460. In the selector 460, selection is performed per byte, depending on the address difference. In this example, the first two bytes of the 8 bytes are selected from the buffer output data 451, and the remainder is selected from the rotator output data 471. Specifically, the zeroth and first bytes are selected from the buffer output data 451, and the second to seventh bytes are selected from the rotator output data 471, so that, from the leading read data, only "xxxABC" required for generation of leading write data is selected and "DE" is not selected. The selector output data 461 is stored into the internal memory 440. The rotator output data 471 which is input to the buffer 450 is temporarily stored.

In the next cycle, when the next read data "FGHIJKLM" is output via the bus interface A 420, the data is rotated by the rotator 470 as in the previous cycle, and "LMFGHIJK" is output. This data is input to the buffer 450 and the selector 460. In the selector 460, since the bytes are split between the first byte and the second byte as in the previous cycle, "FGHIJK" is selected from the rotator output data 471 "LMFGHIJK", and "DE" which is a portion of the read data of the previous cycle is selected from the buffer output data 451. As a result, "DEFGHIJK" is output from the selector 460. This data is stored in the internal memory 440. After data required for generation of write data is stored, the data is read from the internal memory 440 and is transferred via the bus interface B 430 to the transfer destination device.

By repeatedly performing this operation to generate write data, write data can be output every cycle even when transfer source addresses and transfer destination addresses have different byte alignments, resulting in high-speed DMA transfer.

Note that, when transfer source addresses and transfer destination addresses have the same byte alignment, the rotator 470 outputs input data without rotating the input data. The selector 460 invariably selects input data from the rotator output data 471. Since the buffer 450 is not used, power consumption can be suppressed by controlling clock supply.

Also, in the DMA transfer control apparatus 400 of this embodiment, issuance size adjustment can be performed. The issuance size adjustment is performed as described in Embodiment 1 both when transfer source addresses and transfer destination addresses have different byte alignments and when data in a discontinuous area is transferred.

Also, in the DMA transfer control apparatus 400 of this embodiment, read transfer can be performed using a data width smaller than the transfer bus width. The operation is similar to that described in Embodiment 2.

Also, in the DMA transfer control apparatus 400 of this embodiment, a method for efficiently transferring data including a discontinuous area size can be performed. The operation is similar to that described in Embodiment 3.

Embodiment 5

Figure 16:
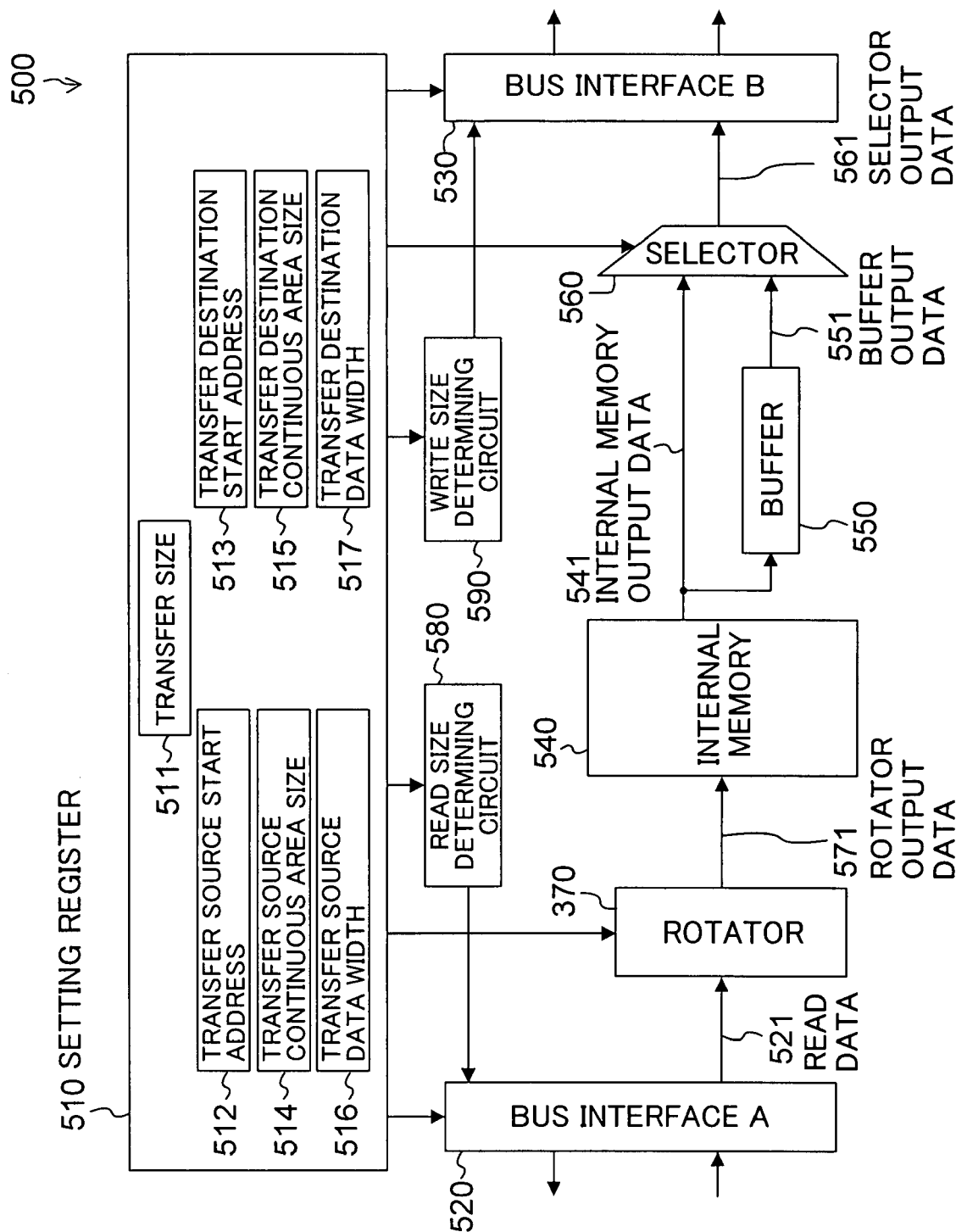
FIG. 16 is a block diagram schematically showing a DMA transfer control apparatus according to Embodiment 5 of the present invention.

FIG. 16 is a block diagram schematically showing a DMA transfer control apparatus 500 according to Embodiment 5 of the present invention. In the DMA transfer control apparatus 500 of this embodiment, a transfer source device or a bus to which the transfer source device is connected is connected to a bus interface A 520, and a transfer destination device or a bus to which the transfer destination device is connected is connected to a bus interface B 530.

The DMA transfer control apparatus 500 has the bus interface A 520, a rotator 570 which receives read data 521 output from the bus interface A 520, an internal memory 540 which receives rotator output data 571 output from the rotator 570, a buffer 550 which receives internal memory output data 541 output from the internal memory 540, a selector 560 which receives the rotator output data 571 and buffer output data 551 output from the buffer 550, and the bus interface B 530 which receives selector output data 561 output from the selector 560.

The DMA transfer control apparatus 500 also has a setting register 510 in which a transfer size 511, a transfer source start address 512, a transfer destination start address 513, a transfer source continuous area size 514, a transfer destination continuous area size 515, a transfer source data width 516, and a transfer destination data width 517 are set.

The DMA transfer control apparatus 500 also has a read size determining circuit 580 and a write size determining circuit 590.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 500 of this embodiment will be described. The read data 521 which is read from the transfer source device via the bus interface A 520 is temporarily stored in the internal memory 540 so as to execute burst transfer. After an appropriate size of data is accumulated in the internal memory 540, the data is read from the internal memory 540. The data output from the internal memory 540 is input to the rotator 570. The rotator 570 determines the number of rotation stages, depending on an address difference obtained by subtracting a set value of the transfer source start address 512 from a set value of the transfer destination start address 513, and rotates the input data, depending on the determined number of rotation stages. The rotator output data 571 is input to the selector 560 and the buffer 550 simultaneously. The buffer 550 temporarily stores the data before outputting the data to the selector 560. The selector 560 selects one of the two pieces of input data per byte, depending on the address difference. Data output from the selector 560 is transferred via the bus interface B 530 to the transfer destination device.

Figure 17:
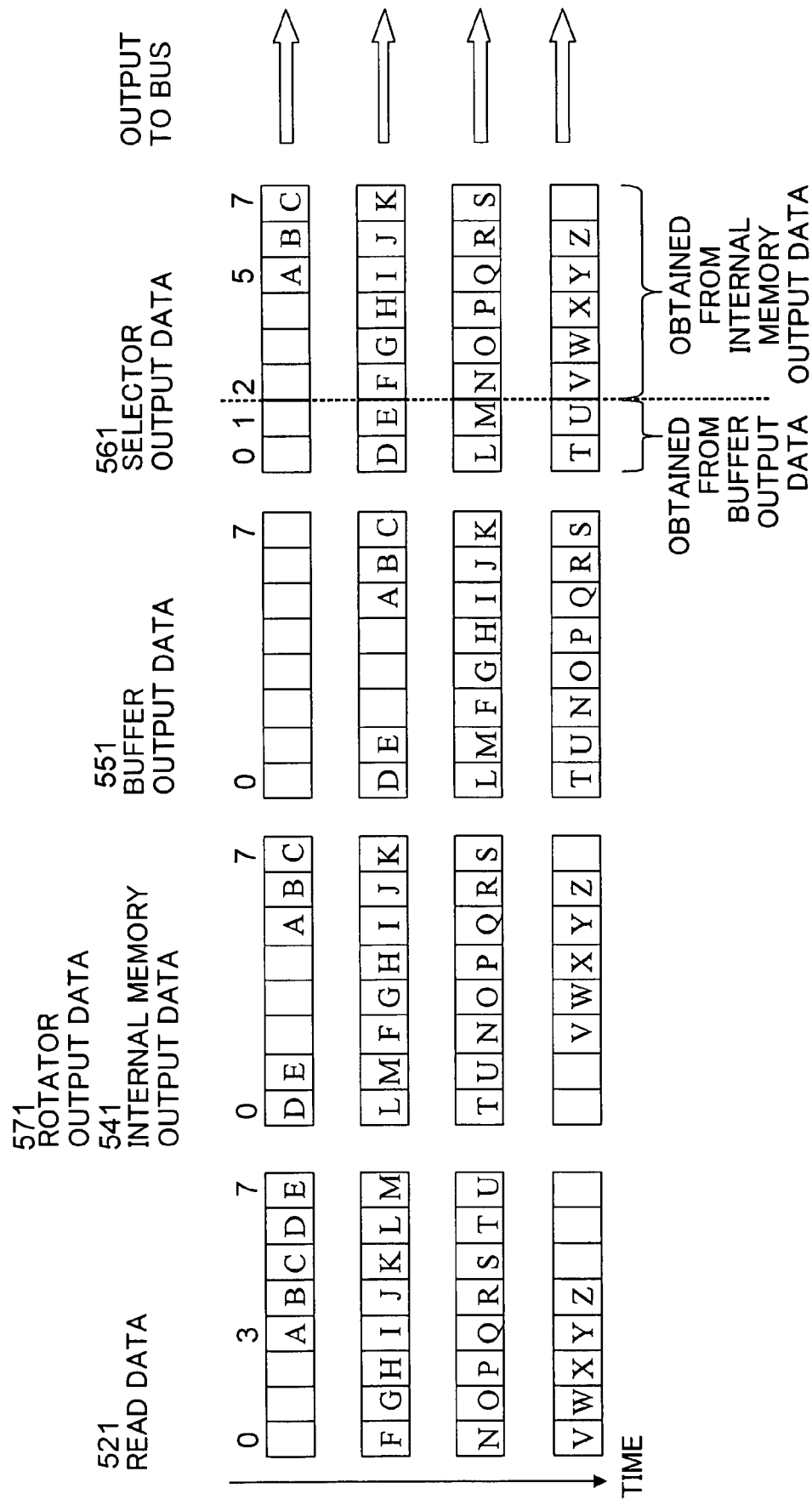
FIG. 17 is a timing flow diagram for describing an exemplary transfer operation when transfer source addresses and transfer destination addresses have different byte alignments, in Embodiment 5 of the present invention.

An exemplary transfer operation when transfer source addresses and transfer destination addresses have different byte alignments will be described with reference to FIG. 17. A transfer bus width is 8 bytes. The three lowest bits of a transfer source start address have a value of 3, and the three lowest bits of a transfer destination start address have a value of 5. Thus, in both the transfer source and the transfer destination, the addresses are not aligned with the transfer bus width, and valid data starts from a halfway byte in leading data.

Initially, leading read data "xxxABCDE" via the bus interface A 520 is input to the rotator 570. In the rotator 570, rotation is performed, depending on a difference obtained by subtracting the three lowest bits of the set value of the transfer source start address 512 from the three lowest bits of the set value of the transfer destination start address 513. In this example, since the difference is 2, the input data is rotated by 2 in the right direction, and the resultant "DExxxABC" is output. The rotator output data 571 is input to internal memory 540. In the next cycle, when the next read data "FGHIJKLM" is output, the data is rotated by the rotator 570 as in the previous cycle. The resultant data "LMFGHIJK" is output and stored into the internal memory 540.

After all data required for generation of write data is stored, the data is read from the internal memory 540 and is input to the buffer 550 and the selector 560. In the selector 560, selection is performed per byte, depending on the address difference. In this example, the first two bytes of the 8 bytes are selected from the buffer output data 551, and the remainder is selected from the internal memory output data 541. Specifically, the zeroth and first bytes are selected from the buffer output data 551, and the second to seventh bytes are selected from the internal memory output data 541, so that, from the leading read data, only "xxxABC" required for generation of leading write data is selected and "DE" is not selected. The selector output data 561 is transferred via the bus interface B 530 to the transfer destination device. The internal memory output data 541 which is input to the buffer 550 is temporarily stored.

In the next cycle, when the next read data "FGHIJKLM" is output from the internal memory 540, the data is rotated by the rotator 570 as in the previous cycle. The resultant data is input to the buffer 550 and the selector 560. In the selector 560, since the bytes are split between the first byte and the second byte as in the previous cycle, "FGHIJK" is selected from the rotator output data 571 "LMFGHIJK", and "DE" which is a portion of the read data of the previous cycle is selected from the buffer output data 551. As a result, "DEFGHIJK" is output from the selector 560. This data is transferred via the bus interface B 530 to the transfer destination device.

By repeatedly performing this operation to generate write data, write data can be output every cycle even when transfer source addresses and transfer destination addresses have different byte alignments, resulting in high-speed DMA transfer.

Note that, when transfer source addresses and transfer destination addresses have the same byte alignment, the rotator 570 outputs input data without rotating the input data. The selector 560 invariably selects input data from the internal memory output data 541. Since the buffer 550 is not used, power consumption can be suppressed by controlling clock supply.

Also, in the DMA transfer control apparatus 500 of this embodiment, issuance size adjustment can be performed. The issuance size adjustment is performed as described in Embodiment 1 both when transfer source addresses and transfer destination addresses have different byte alignments and when data in a discontinuous area is transferred.

Embodiment 6

Figure 18:
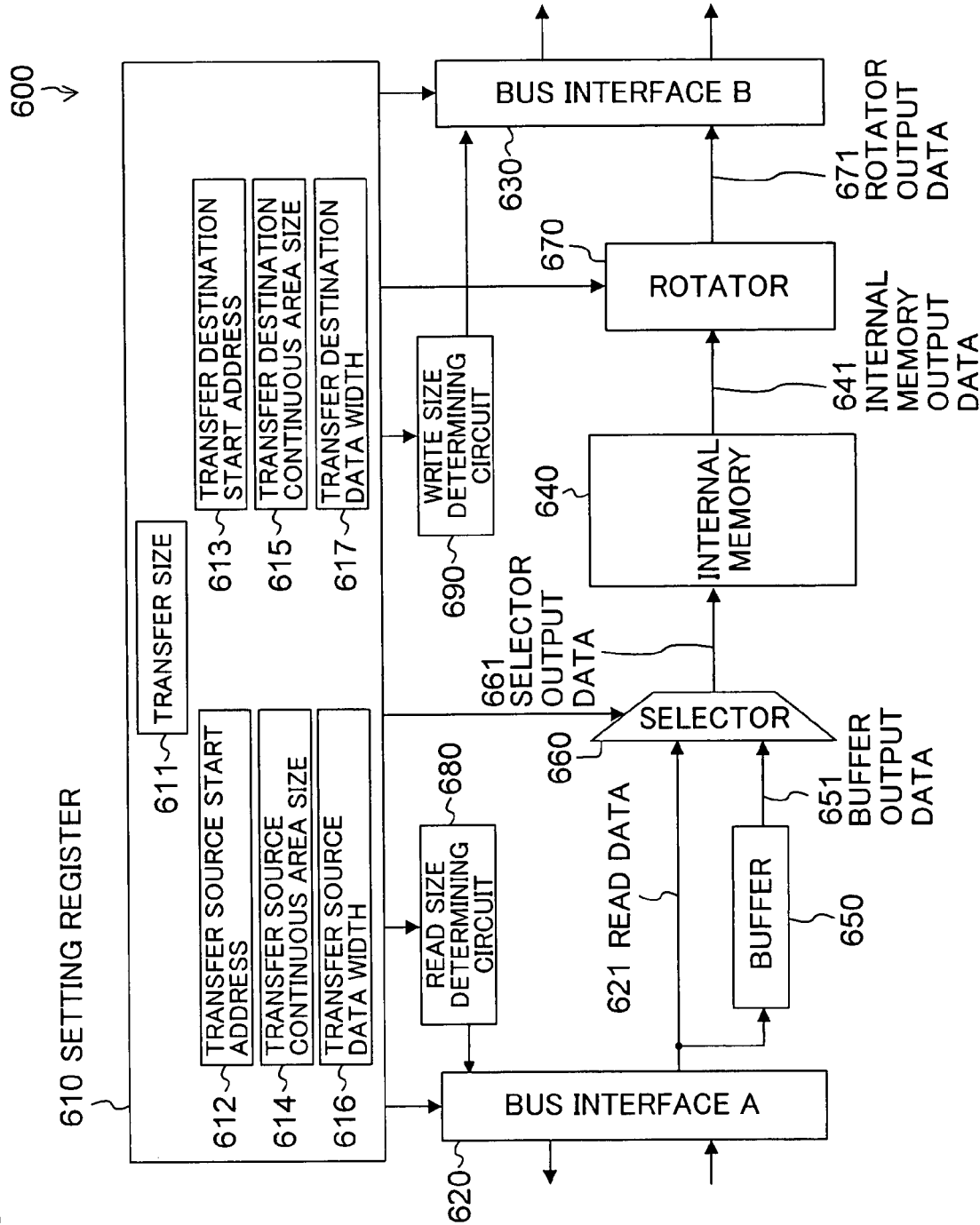
FIG. 18 is a block diagram schematically showing a DMA transfer control apparatus according to Embodiment 6 of the present invention.

FIG. 18 is a block diagram schematically showing a DMA transfer control apparatus 600 according to Embodiment 6 of the present invention. In the DMA transfer control apparatus 600 of this embodiment, a bus to which a transfer source device is connected is connected to a bus interface A 620, and a bus to which a transfer destination device is connected is connected to a bus interface B 630.

The DMA transfer control apparatus 600 has the bus interface A 620, a buffer 650 which receives read data 621 output from the bus interface A 620, a selector 660 which receives the read data 621 and buffer output data 651 output from the buffer 650, an internal memory 640 which receives selector output data 661 output from the selector 660, a rotator 670 which receives internal memory output data 641 output from the internal memory 640, and the bus interface B 630 which receives rotator output data 671 output from the rotator 670.

The DMA transfer control apparatus 600 also has a setting register 610 in which a transfer size 611, a transfer source start address 612, a transfer destination start address 613, a transfer source continuous area size 614, a transfer destination continuous area size 615, a transfer source data width 616, and a transfer destination data width 617 are set.

The DMA transfer control apparatus 600 also has a read size determining circuit 680 and a write size determining circuit 690.

Note that it is clear that a setting register for storing information required for transfer is not limited to this, and the transfer information may be supplied in different manners (e.g., the transfer information is input from an external terminal, etc.).

Next, a flow of data transfer in the DMA transfer control apparatus 600 of this embodiment will be described. The read data 621 which is read from the transfer source device via the bus interface A 620 is input to the selector 660 and the buffer 650 simultaneously. The buffer 650 temporarily stores the data before outputting the data to the selector 660. The selector 660 selects one of the two pieces of input data per byte, depending on a difference obtained by subtracting a set value of the transfer source start address 612 from a set value of the transfer destination start address 613. Data output from the selector 660 is temporarily stored in the internal memory 640 so as to execute burst transfer. After an appropriate size of data is accumulated in the internal memory 640, the data is read from the internal memory 240. The data output from the internal memory 640 is input to the rotator 670. The rotator 670 determines the number of rotation stages, depending on the address difference, and rotates the input data, depending on the determined number of rotation stages. The data output from the internal memory 640 is transferred via the bus interface B 630 to the transfer destination device.

Figure 19:
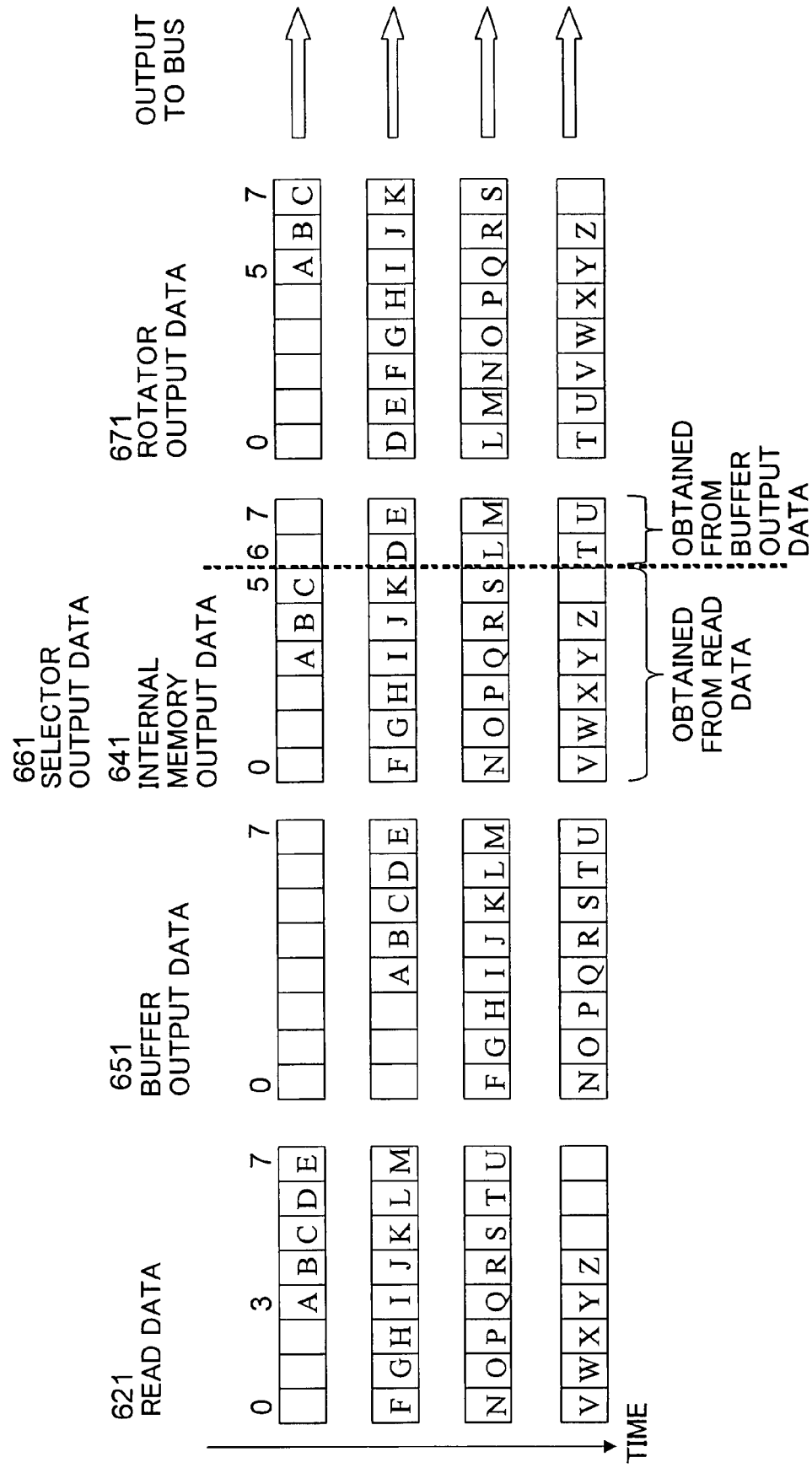
FIG. 19 is a timing flow diagram for describing an exemplary transfer operation when transfer source addresses and transfer destination addresses have different byte alignments, in Embodiment 6 of the present invention.

An exemplary transfer operation when transfer source addresses and transfer destination addresses have different byte alignments will be described with reference to FIG. 19. A transfer bus width is 8 bytes. The three lowest bits of a transfer source start address have a value of 3, and the three lowest bits of a transfer destination start address have a value of 5. Thus, in both the transfer source and the transfer destination, the addresses are not aligned with the transfer bus width, and valid data starts from a halfway byte in leading data.

Initially, leading read data "xxxABCDE" is transmitted via the bus interface A 620 to the buffer 650 and the selector 660. In the selector 660, selection is performed per byte, depending on a difference obtained by subtracting the three lowest bits of the set value of the transfer source start address 612 from the three lowest bits of the set value of the transfer destination start address 613. In this example, since the difference is 2, the last two bytes of the eight bytes are selected from buffer output data 651, and the remainder is selected from the read data 621. Specifically, the zeroth to fifth bytes are selected from the read data 621, while the sixth and seventh bytes are selected from the buffer output data 651. Therefore, from the leading read data, only "xxxABC" required for generation of leading write data is selected, and "DE" is not selected. The selector output data 661 is input to the internal memory 640. The read data 621 which is input to the buffer 650 is temporarily stored.

In the next cycle, the next read data "FGHIJKLM" is output via the bus interface A 620 to the buffer 650 and the selector 660 as in the previous cycle. In the selector 660, the bytes are split between the fifth byte and the sixth byte as in the previous cycle, "FGHIJK" is selected from the internal memory output data 641 "FGHIJKLM", and "DE" which is a portion of the read data of the previous cycle is selected from the buffer output data 651. As a result, "FGHIJKDE" is output from the selector 660. This selector output data 661 is transferred to the internal memory 640.

After an appropriate size of data is accumulated in the internal memory 640, the data is read from the internal memory 640. The internal memory output data 641 is input to the rotator 670, in which the internal memory output data 641 is rotated in the right direction by the address difference. Specifically, the input leading read data "xxxABCxx" is rotated by 2 in the right direction, and the resultant "xxxxx-ABC" is output.

In the next cycle, the next internal memory output data "FGHIJKDE" is rotated by the rotator 670 as in the previous cycle, and the resultant data "DE FGHIJK" is output and transferred as the rotator output data 671 to the internal memory 640.

By repeatedly performing this operation to generate write data, read data can be received every cycle even when transfer source addresses and transfer destination addresses have different byte alignments. Also, appropriate write data is stored in the internal memory 660, depending on the transfer source address, resulting in high-speed DMA transfer.

Note that, when transfer source addresses and transfer destination addresses have the same byte alignment, the selector 660 invariably selects data input from the read data 621, and the rotator 670 outputs input data without rotating the input data. Since the buffer 650 is not used, power consumption can be suppressed by controlling clock supply.

Also, in the DMA transfer control apparatus 600 of this embodiment, issuance size adjustment can be performed. The issuance size adjustment is performed as described in Embodiment 1 both when transfer source addresses and transfer destination addresses have different byte alignments and when data in a discontinuous area is transferred.

Also, in the DMA transfer control apparatus 600 of this embodiment, read transfer can be performed using a data width smaller than the transfer bus width. The operation is similar to that described in Embodiment 2.

Embodiment 7

Figure 20:
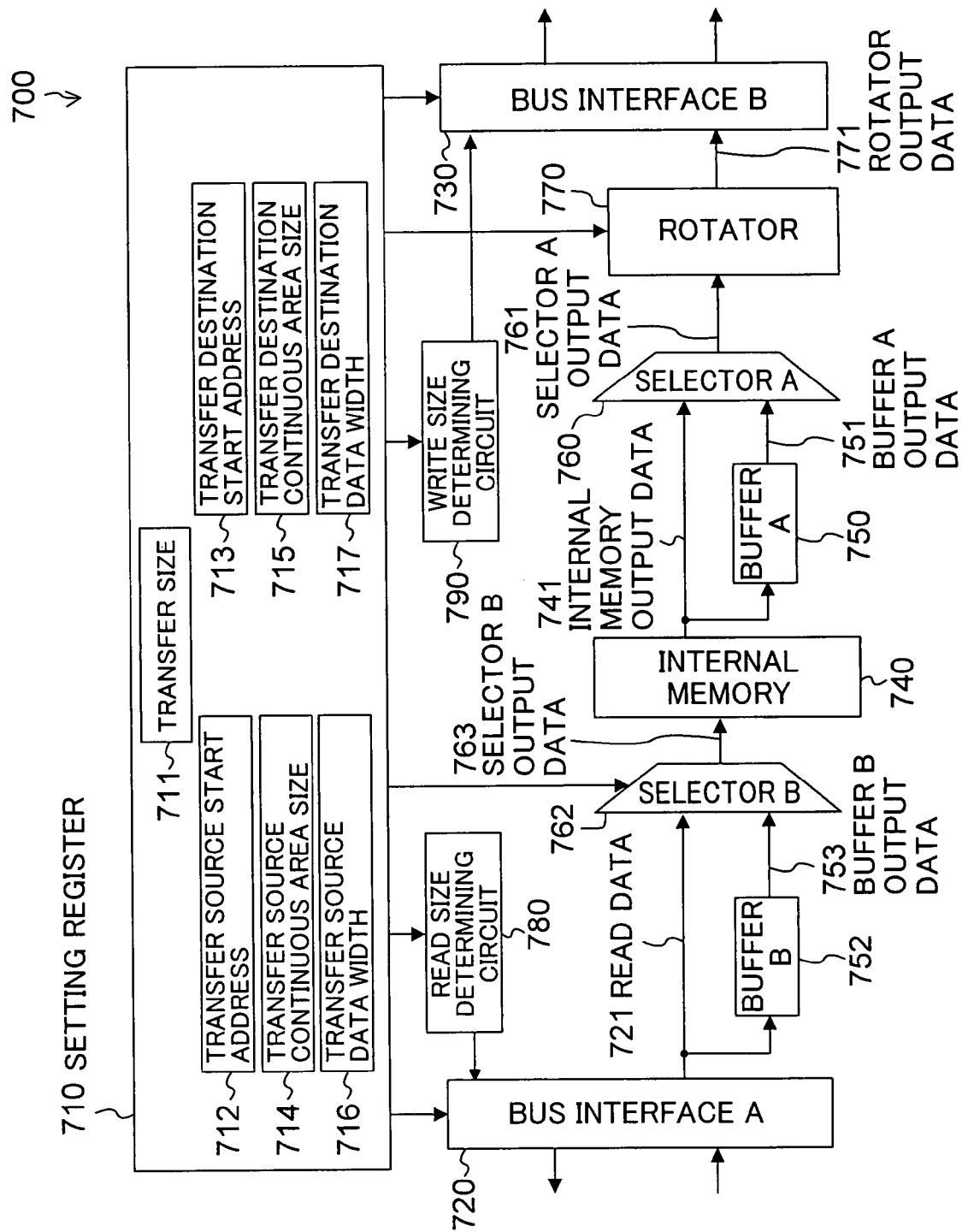
FIG. 20 is a block diagram schematically showing a DMA transfer control apparatus according to Embodiment 7 of the present invention.

FIG. 20 is a block diagram schematically showing a DMA transfer control apparatus 700 according to Embodiment 7 of the present invention. In the DMA transfer control apparatus 700 of this embodiment, a transfer source device or a bus to which the transfer source device is connected is connected to a bus interface A 720, and a transfer destination device or a bus to which the transfer destination device is connected is connected to a bus interface B 730.

The DMA transfer control apparatus 700 has the bus interface A 720, a buffer B 752 which receives read data 721 output from the bus interface A 720, a selector B 762 which receives the read data 721 and buffer B output data 753 output from the buffer B 752, an internal memory 740 which receives selector output data 763 output from the selector B 762, a buffer A 750 which receives internal memory output data 741 output from the internal memory 740, a selector A 760 which receives the internal memory output data 741 and buffer A output data 751, a rotator 770 which receives selector A output data 761 output from the selector A 760, and a bus interface B 730 which receives rotator output data 771 output from the rotator 770. In other words, the DMA transfer control apparatus 700 of FIG. 20 comprises the buffer B 752 and the selector B 762 as a second buffer and a second selector in addition to the buffer A 750 and the selector A 760, which are similar to those of the DMA transfer control apparatus 100 of Embodiment 1 of the present invention (see FIG. 1).

The DMA transfer control apparatus 700 also has a setting register 710 in which a transfer size 711, a transfer source start address 712, a transfer destination start address 713, a transfer source continuous area size 714, a transfer destination continuous area size 715, a transfer source data width 716, and a transfer destination data width 717 are set.

The DMA transfer control apparatus 700 also has a read size determining circuit 780 and a write size determining circuit 790.

Note that it is clear that a setting register for storing information required for transfer is not limited to this, and the transfer information may be supplied in different manners (e.g., the transfer information is input from an external terminal, etc.).

Also, in DMA transfer control apparatus 700 of this embodiment, data transfer can be performed when transfer source start addresses and transfer destination start addresses have different byte alignments. The operation is similar to that described in Embodiment 1, except that the selector B 762 invariably selects input data from the read data 721.

Also, in DMA transfer control apparatus 700 of this embodiment, read transfer can be performed using a data width smaller than the transfer bus width by using the buffer B 752 and the selector B 762. The read operation in this case is similar to that described in Embodiment 2.

Note that, in the DMA transfer control apparatus 300 of Embodiment 3 of the present invention (see FIG. 11), a second buffer and a second selector can be added before or after the internal memory 340. Similarly, in the DMA transfer control apparatus 500 of Embodiment 5 of the present invention (see FIG. 16), a second buffer and a second selector can be added before or after the rotator 570.

Embodiments 1 to 7 of the present invention have been heretofore described. Finally, a circuit configuration for achieving the selector function and the rotator function of Embodiments 1, 2 and 7 will be described.

Figure 21:
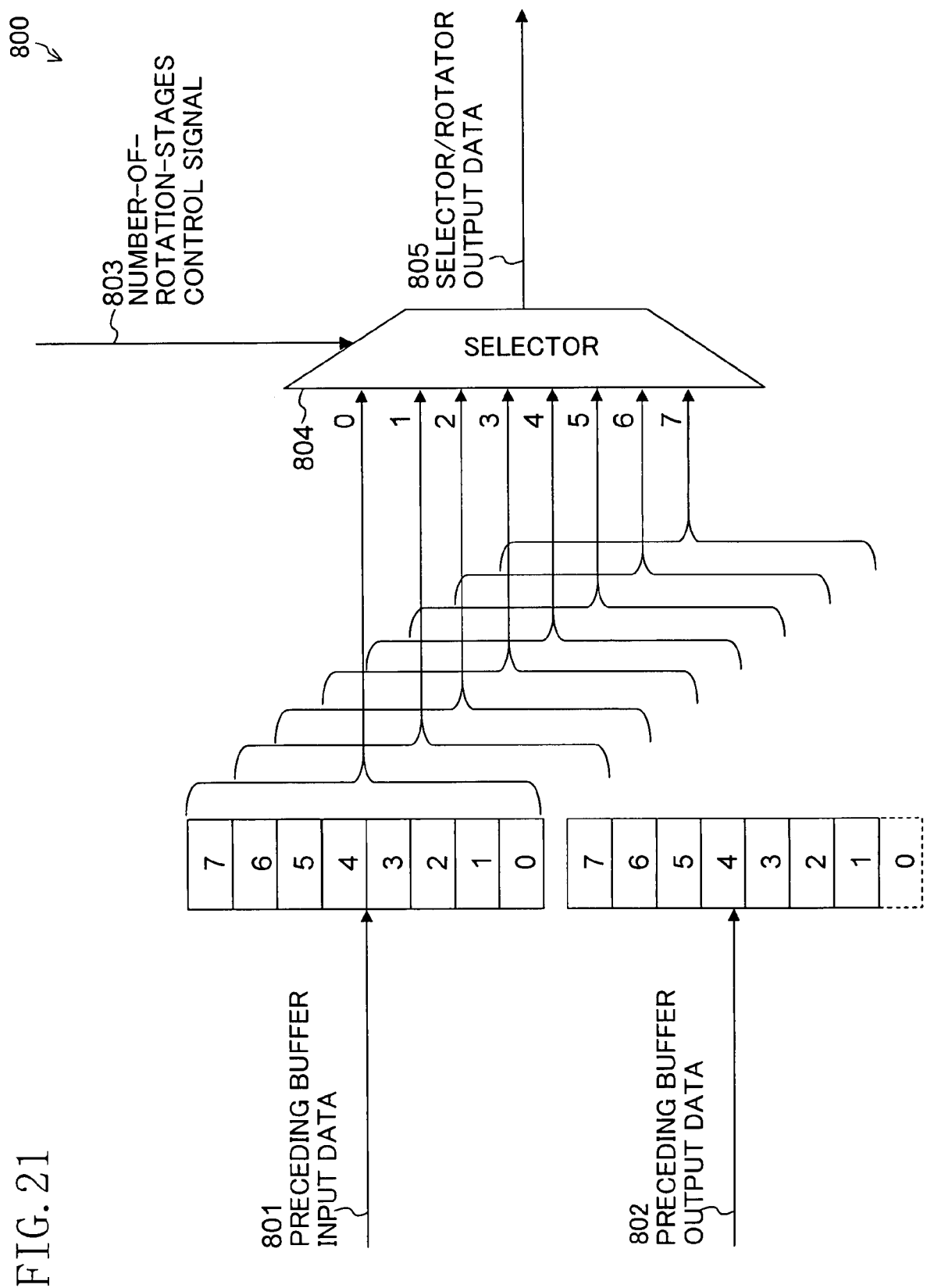
FIG. 21 is a block diagram schematically showing a configuration of a selector/rotator circuit for achieving a selector function and a rotator function in Embodiments 1, 2 and 7 of the present invention.
Figure 22:
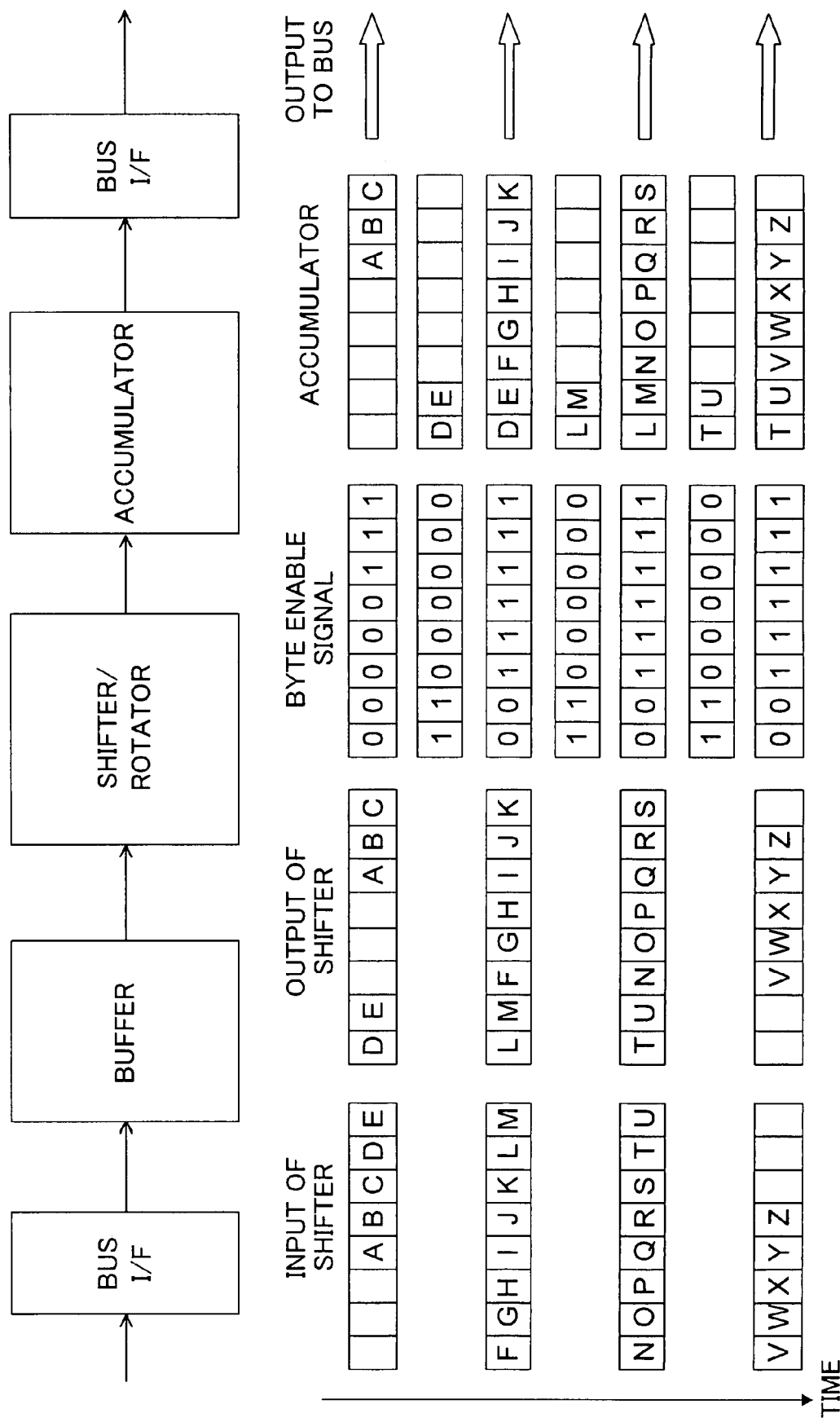
FIG. 22 shows a block diagram schematically showing a configuration of a conventional data transfer control apparatus and a timing flow diagram for describing an exemplary transfer operation when transfer source addresses and transfer destination addresses have different byte alignments.

FIG. 21 is a block diagram schematically showing a configuration of a selector/rotator circuit 800. The selector/rotator circuit 800 of FIG. 21 receives buffer input data 801, buffer output data 802, and number-of-rotation-stages control signal 803, comprises a selector 804, and outputs selector/rotator output data 805.

Data input to the selector 804 is generated by selecting and concatenating any of the buffer input data 801 and the buffer output data 802 per byte, and has the same width as the transfer bus width. From these pieces of data, the selector 804 selects a piece of data, depending on the number-of-rotation-stages control signal 803, and outputs the selected data as the selector/rotator output data 805. For example, when the number-of-rotation-stages control signal 803 is 3, the zeroth to fourth bytes of the buffer input data 801 and the fifth to seventh bytes of the buffer output data 802 are concatenated to generate 8-byte data, which is output as the selector/rotator output data 805.

The selector/rotator circuit of FIG. 21 can be utilized as a circuit for achieving the selector function and the rotator function when the output of the selector is connected to the input of the rotator as in Embodiments 1, 2 and 7. By using this circuit, a necessary selection function and rotation function can be achieved by a small-scale circuit.

As described above, according to the DMA transfer control apparatus of the present invention, even when transfer source addresses and transfer destination addresses have different byte alignments, DMA transfer can be achieved by adding a small circuit and without a decrease in transfer rate. Therefore, addresses or the like can be flexibly set without being concerned about a decrease in performance due to a difference in byte alignment. A bus adaptor including a DMA transfer control function is also effective for data transfer between buses having different protocols (e.g., having different byte alignments, etc.).

What is claimed is:

1. A DMA transfer control apparatus for performing direct memory access (DMA) transfer from a transfer source to a transfer destination, the DMA transfer control apparatus comprising:
   an internal memory for temporarily storing data;
   a buffer for temporarily storing data;
   a selector configured to receive an input data which is input to the buffer and an output data which is output from the buffer; and
   a rotator for rotating data, wherein:
   the selector selects one of the input data and the output per byte,
   the internal memory, the selector connected to the input and the output of the buffer, and the rotator are connected in any order, and
   the rotator determines the number of rotation stages, using a difference between a transfer source address and a transfer destination address.

2. A DMA transfer control apparatus for performing direct memory access (DMA) transfer from a transfer source to a transfer destination, the DMA transfer control apparatus comprising:
   an internal memory for temporarily storing data;
   a buffer for temporarily storing data;
   a selector configured to receive an input data which is input to the buffer and an output data which is output from the buffer; and
   a rotator for rotating data, wherein:
   the selector selects one of the input data and the output per byte,
   the internal memory, the selector connected to the input and the output of the buffer, and the rotator are connected in any order, and
   the selector determines selection, using a difference between a transfer source address and a transfer destination address.

3. A DMA transfer control apparatus for performing direct memory access (DMA) transfer from a transfer source to a transfer destination, the DMA transfer control apparatus comprising:
   an internal memory for temporarily storing data;
   a buffer for temporarily storing data;
   a selector configured to receive an input data which is input to the buffer and an output data which is output from the buffer;
   a rotator for rotating data; and
   at least one of a read size determining circuit for determining a read transfer size for a transfer source and a write size determining circuit for determining a write transfer size for a transfer destination, wherein:
   the selector selects one of the input data and the output per byte,
   the internal memory, the selector connected to the input and the output of the buffer, and the rotator are connected in any order, and
   the read size determining circuit and the write size determining circuit determine a read size or a write size using a continuous area size from a read address of a transfer source and a continuous area size from a write address of a transfer destination.

4. A DMA transfer control apparatus for performing direct memory access (DMA) transfer from a transfer source to a transfer destination, the DMA transfer control apparatus comprising:
 an internal memory for temporarily storing data;
 a buffer for temporarily storing data;
 a selector configured to receive an input data which is input to the buffer and an output data which is output from the buffer; and
 a rotator for rotating data, wherein:
 the selector selects one of the input data and the output per byte,
 the internal memory, the selector connected to the input and the output of the buffer, and the rotator are connected in any order,
 the internal memory receives read data from a transfer source,
 the rotator receives data from the internal memory,
 the buffer receives data from the rotator,
 the selector receives data from the rotator and data from the buffer, and
 the selector determines selection using a continuous area size from a read address of a transfer source and a continuous area size from a write address of a transfer destination.

5. A DMA transfer control apparatus for performing direct memory access (DMA) transfer from a transfer source to a transfer destination, the DMA transfer control apparatus comprising:
 an internal memory for temporarily storing data;
 a buffer for temporarily storing data;
 a selector configured to receive an input data which is input to the buffer and an output data which is output from the buffer; and
 a rotator for rotating data, wherein:
 the selector selects one of the input data and the output per byte,
 the internal memory, the selector connected to the input and the output of the buffer, and the rotator are connected in any order,
 the internal memory receives read data from a transfer source,
 the rotator receives data from the internal memory,
 the buffer receives data from the rotator,
 the selector receives data from the rotator and data from the buffer, and
 the rotator determines the number of rotation stages using a continuous area size from a read address of a transfer source and a continuous area size from a write address of a transfer destination.

6. A DMA transfer control apparatus for performing direct memory access (DMA) transfer from a transfer source to a transfer destination, the DMA transfer control apparatus comprising:
 an internal memory for temporarily storing data;
 a buffer for temporarily storing data;
 a selector configured to receive an input data which is input to the buffer and an output data which is output from the buffer; and
 a rotator for rotating data, wherein:
 the selector selects one of the input data and the output per byte,
 the internal memory, the selector connected to the input and the output of the buffer, and the rotator are connected in any order,
 the rotator receives read data a transfer source,
 the buffer receives data from the rotator,
 the selector receives data from the rotator and data from the buffer,
 the internal memory receives data selected by the selector, and
 the rotator determines the number of rotation stages using a continuous area size from a read address of a transfer source and a continuous area size from a write address of a transfer destination.

7. A DMA transfer control apparatus for performing direct memory access (DMA) transfer from a transfer source to a transfer destination, the DMA transfer control apparatus comprising:
 an internal memory for temporarily storing data;
 a buffer for temporarily storing data;
 a selector configured to receive an input data which is input to the buffer and an output data which is output from the buffer; and
 a rotator for rotating data, wherein:
 the selector selects one of the input data and the output per byte,
 the internal memory, the selector connected to the input and the output of the buffer, and the rotator are connected in any order,
 the rotator receives read data a transfer source,
 the buffer receives data from the rotator,
 the selector receives data from the rotator and data from the buffer,
 the internal memory receives data selected by the selector, and
 the selector determines selection using a continuous area size from a read address of a transfer source and a continuous area size from a write address of a transfer destination.

* * * * *